(12) United States Patent
Keefer et al.

(10) Patent No.: US 7,387,849 B2
(45) Date of Patent: *Jun. 17, 2008

(54) HYDROGEN RECYCLE FOR SOLID OXIDE FUEL CELL

(75) Inventors: Bowie G. Keefer, Vancouver (CA); Matthew L. Babicki, West Vancouver (CA)

(73) Assignee: QuestAir Technologies Inc., Burnaby, British Columbia (CA)

( * ) Notice: Subject to any disclaimer, the term of this patent is extended or adjusted under 35 U.S.C. 154(b) by 218 days.

This patent is subject to a terminal disclaimer.

(21) Appl. No.: 10/389,541

(22) Filed: Mar. 14, 2003

(65) Prior Publication Data

US 2004/0005492 A1 Jan. 8, 2004

Related U.S. Application Data

(60) Provisional application No. 60/376,683, filed on Apr. 29, 2002, provisional application No. 60/364,771, filed on Mar. 14, 2002.

(51) Int. Cl.
*H01M 8/04* (2006.01)
*H01M 8/12* (2006.01)

(52) U.S. Cl. .......................... 429/34; 429/19; 429/30; 429/13

(58) Field of Classification Search .................. 429/34, 429/13
See application file for complete search history.

(56) References Cited

U.S. PATENT DOCUMENTS

| 3,094,569 A | 6/1963 | Thomas |
| 3,204,388 A | 9/1965 | Asker |
| 3,430,418 A | 3/1969 | Wagner |
| 3,513,631 A | 5/1970 | Siebert et al. |
| 3,564,816 A | 2/1971 | Batta |
| 3,594,984 A | 7/1971 | Toyama et al. |

(Continued)

FOREIGN PATENT DOCUMENTS

CA 1256038 6/1989

(Continued)

OTHER PUBLICATIONS

Carvill et al., *AIChE J.* 42(10):2765-2772, Oct. 1996.

(Continued)

*Primary Examiner*—John S Maples
(74) *Attorney, Agent, or Firm*—Klarquist Sparkman, LLP

(57) ABSTRACT

The present disclosure relates to solid oxide fuel cells (SOFCs) exploiting gas separation devices in which a first gas mixture including components A (for example hydrogen) and B (for example carbon dioxide) is to be separated so that a first product of the separation is enriched in component A, while component B is mixed with a third gas component C (for example air, oxygen-enriched air or oxygen-depleted air) contained in a displacement purge stream to form a second gas mixture including components B and C, and with provision to prevent cross contamination of component C into the first product containing component A, or of component A into the second gas mixture containing component C. The invention may be applied to hydrogen (component A) enrichment from fuel cell anode exhaust, where dilute carbon dioxide (component B) is to be rejected such as to the atmosphere by purging with cathode exhaust oxygen-depleted air (as component C).

14 Claims, 16 Drawing Sheets

U.S. PATENT DOCUMENTS

| | | | |
|---|---|---|---|
| 3,847,672 A | 11/1974 | Trocciola et al. |
| 3,865,924 A | 2/1975 | Gidaspow et al. |
| 4,019,879 A | 4/1977 | Rabo et al. |
| 4,144,037 A | 3/1979 | Armond et al. |
| 4,153,434 A | 5/1979 | Settlemyer |
| 4,200,682 A | 4/1980 | Sederquist |
| 4,272,265 A | 6/1981 | Snyder |
| 4,322,394 A | 3/1982 | Mezey et al. |
| 4,354,859 A | 10/1982 | Keller et al. |
| 4,406,675 A | 9/1983 | Dangieri et al. |
| 4,452,612 A | 6/1984 | Mattia |
| 4,530,705 A | 7/1985 | Firey |
| 4,532,192 A | 7/1985 | Baker et al. |
| 4,553,981 A | 11/1985 | Fuderer |
| 4,555,453 A | 11/1985 | Appleby |
| 4,578,214 A | 3/1986 | Jungerhans |
| 4,587,114 A | 5/1986 | Hirai et al. |
| 4,595,642 A | 6/1986 | Nakanishi et al. |
| 4,696,682 A | 9/1987 | Hirai et al. |
| 4,702,903 A | 10/1987 | Keefer |
| 4,726,816 A | 2/1988 | Fuderer |
| 4,743,276 A | 5/1988 | Nishida et al. |
| 4,758,253 A | 7/1988 | Davidson et al. |
| 4,759,997 A | 7/1988 | Ohyauchi et al. |
| 4,781,735 A | 11/1988 | Tagawa et al. |
| 4,783,433 A | 11/1988 | Tajima et al. |
| 4,790,858 A | 12/1988 | Sircar |
| 4,801,308 A | 1/1989 | Keefer |
| 4,816,121 A | 3/1989 | Keefer |
| 4,914,076 A | 4/1990 | Tsuji et al. |
| 4,917,711 A | 4/1990 | Xie et al. |
| 4,963,339 A | 10/1990 | Krishnamurthy et al. |
| 4,968,329 A | 11/1990 | Keefer |
| 4,969,935 A | 11/1990 | Hay |
| 4,988,580 A | 1/1991 | Ohsaki et al. |
| 4,994,331 A | 2/1991 | Cohen |
| 5,068,159 A | 11/1991 | Kinoshita |
| 5,079,103 A | 1/1992 | Schramm |
| 5,082,473 A | 1/1992 | Keefer |
| 5,096,469 A | 3/1992 | Keefer |
| 5,096,470 A | 3/1992 | Krishnamurthy |
| 5,126,310 A | 6/1992 | Golden et al. |
| 5,133,784 A | 7/1992 | Boudet et al. |
| 5,147,735 A | 9/1992 | Ippommatsu et al. |
| 5,175,061 A | 12/1992 | Hildebrandt et al. |
| 5,227,598 A | 7/1993 | Woodmansee et al. |
| 5,245,110 A | 9/1993 | Van Dijk et al. |
| 5,246,676 A | 9/1993 | Hay |
| 5,248,325 A | 9/1993 | Kagimoto et al. |
| 5,256,172 A | 10/1993 | Keefer |
| 5,256,174 A | 10/1993 | Kai et al. |
| 5,258,571 A | 11/1993 | Golden et al. |
| 5,271,916 A | 12/1993 | Vanderborgh et al. |
| 5,282,886 A | 2/1994 | Kobayashi et al. |
| 5,328,503 A | 7/1994 | Kumar et al. |
| 5,360,679 A | 11/1994 | Buswell et al. |
| 5,366,818 A | 11/1994 | Wilkinson et al. |
| 5,393,326 A | 2/1995 | Engler et al. |
| 5,411,578 A | 5/1995 | Watson et al. |
| 5,415,748 A | 5/1995 | Emiliani et al. |
| 5,429,665 A | 7/1995 | Botich |
| 5,431,716 A | 7/1995 | Ebbeson |
| 5,434,016 A | 7/1995 | Benz et al. |
| 5,441,559 A | 8/1995 | Petit et al. |
| 5,487,775 A | 1/1996 | LaCava et al. |
| 5,509,956 A | 4/1996 | Opperman et al. |
| 5,523,326 A | 6/1996 | Dandekar et al. |
| 5,529,763 A | 6/1996 | Peng et al. |
| 5,529,970 A | 6/1996 | Peng |
| 5,531,809 A | 7/1996 | Golden et al. |
| 5,543,238 A | 8/1996 | Strasser |
| 5,593,478 A | 1/1997 | Hill et al. |
| 5,604,047 A | 2/1997 | Bellows et al. |
| 5,632,807 A | 5/1997 | Tomita et al. |
| 5,645,950 A | 7/1997 | Benz et al. |
| 5,646,305 A | 7/1997 | Wagner et al. |
| 5,656,067 A | 8/1997 | Watson et al. |
| 5,658,370 A | 8/1997 | Vigor et al. |
| 5,711,926 A | 1/1998 | Knaebel |
| 5,714,276 A | 2/1998 | Okamoto |
| 5,766,311 A | 6/1998 | Ackley et al. |
| 5,811,201 A | 9/1998 | Skowronski |
| 5,827,358 A | 10/1998 | Kulish et al. |
| 5,876,486 A | 3/1999 | Steinwandel et al. |
| 5,891,217 A | 4/1999 | Lemcoff et al. |
| 5,900,329 A | 5/1999 | Reiter et al. |
| 5,917,136 A | 6/1999 | Gaffney et al. |
| 5,925,322 A | 7/1999 | Werth |
| 5,955,039 A | 9/1999 | Dowdy |
| 5,958,109 A | 9/1999 | Fuderer |
| 5,968,680 A | 10/1999 | Wolfe et al. |
| 5,980,857 A | 11/1999 | Kapoor et al. |
| 5,981,096 A | 11/1999 | Hornberg et al. |
| 5,998,056 A | 12/1999 | Divisek et al. |
| 6,022,399 A | 2/2000 | Ertl et al. |
| 6,045,933 A | 4/2000 | Okamoto |
| 6,051,050 A | 4/2000 | Keefer et al. |
| 6,056,804 A * | 5/2000 | Keefer et al. ............... 95/96 |
| 6,060,032 A | 5/2000 | Hable et al. |
| 6,063,161 A | 5/2000 | Keefer et al. |
| 6,077,620 A | 6/2000 | Pettit |
| 6,090,312 A | 7/2000 | Ziaka et al. |
| 6,143,057 A | 11/2000 | Bülow et al. |
| 6,162,558 A | 12/2000 | Borup et al. |
| 6,176,897 B1 | 1/2001 | Keefer |
| 6,190,623 B1 | 2/2001 | Sanger et al. |
| 6,190,791 B1 | 2/2001 | Hornburg |
| 6,200,365 B1 | 3/2001 | Eimer et al. |
| 6,210,822 B1 | 4/2001 | Abersfelder et al. |
| 6,231,644 B1 | 5/2001 | Jain et al. |
| 6,255,010 B1 | 7/2001 | George et al. |
| 6,283,723 B1 | 9/2001 | Milburn et al. |
| 6,293,998 B1 | 9/2001 | Dolan et al. |
| 6,296,823 B1 | 10/2001 | Ertl et al. |
| 6,312,843 B1 | 11/2001 | Kimbara et al. |
| 6,358,300 B1 | 3/2002 | Fornof et al. |
| 6,398,853 B1 | 6/2002 | Keefer et al. |
| 6,406,523 B1 | 6/2002 | Connor et al. |
| 6,428,915 B1 | 8/2002 | Ban et al. |
| 6,607,854 B1 * | 8/2003 | Rehg et al. ............... 429/13 |
| 6,667,128 B2 | 12/2003 | Edlund |
| 6,692,545 B2 | 2/2004 | Gittleman et al. |
| 6,902,602 B2 | 6/2005 | Keefer et al. |
| 7,041,272 B2 * | 5/2006 | Keefer et al. ............... 423/651 |
| 2001/0047824 A1 | 12/2001 | Hill et al. |
| 2002/0004157 A1 | 1/2002 | Keefer et al. |
| 2002/0098394 A1 | 7/2002 | Keefer et al. |
| 2002/0104518 A1 | 8/2002 | Keefer et al. |
| 2002/0110503 A1 | 8/2002 | Gittleman et al. |
| 2002/0110504 A1 | 8/2002 | Gittleman et al. |
| 2002/0112479 A1 | 8/2002 | Keefer et al. |
| 2002/0127442 A1 | 9/2002 | Connor et al. |
| 2002/0142198 A1 | 10/2002 | Towler et al. |
| 2002/0142208 A1* | 10/2002 | Keefer et al. ............... 429/34 |
| 2003/0143448 A1 | 7/2003 | Keefer et al. |
| 2003/0157390 A1* | 8/2003 | Keefer et al. ............... 429/34 |
| 2004/0005492 A1 | 1/2004 | Keefer et al. |
| 2004/0131912 A1 | 7/2004 | Keefer et al. |
| 2004/0197612 A1 | 10/2004 | Keefer et al. |

FOREIGN PATENT DOCUMENTS

| | | |
|---|---|---|
| CA | 2016045 | 8/1994 |
| CA | 2109055 | 2/1999 |

| | | |
|---|---|---|
| CA | 2087972 | 1/2000 |
| CA | 2087973 | 1/2001 |
| CA | 2 325 07 | 4/2002 |
| DE | 3913 581 A1 | 11/1990 |
| EP | 0 341 189 A1 | 8/1989 |
| EP | 0 345 908 | 12/1989 |
| EP | 0 143 537 A2 | 3/1990 |
| EP | 0 143 537 B1 | 3/1990 |
| EP | 0 681 860 A2 | 7/1996 |
| EP | 0 691 701 A1 | 10/1996 |
| EP | 0 737 648 | 10/1996 |
| EP | 0 750 361 A | 12/1996 |
| EP | 0 751 045 | 1/1997 |
| EP | 0 853 967 | 7/1998 |
| EP | 1 095 689 A1 | 10/1999 |
| EP | 1 070 531 A2 | 1/2001 |
| EP | 1 172 772 | 1/2002 |
| GB | 2 042 365 | 9/1980 |
| JP | 59075574 A | 4/1984 |
| JP | 62-274561 * | 11/1987 |
| JP | 62274561 | 11/1987 |
| JP | 62278770 | 12/1987 |
| JP | 63034862 | 2/1988 |
| JP | 63166137 | 7/1988 |
| JP | 63 228572 A | 9/1988 |
| JP | 04 206161 A | 7/1992 |
| JP | 05 166528 | 7/1993 |
| JP | 07094200 | 7/1995 |
| JP | 8045526 A2 | 2/1996 |
| JP | 10 027621 A | 1/1998 |
| JP | 10325360 | 12/1998 |
| JP | 10325360 A | 12/1998 |
| JP | 11214021 A2 | 8/1999 |
| JP | 2002 358972 | 12/2002 |
| WO | WO 94/04249 | 8/1992 |
| WO | WO 96/13871 | 5/1996 |
| WO | WO 98/29182 | 9/1998 |
| WO | WO 99/01202 | 1/1999 |
| WO | WO 99/19249 | 4/1999 |
| WO | WO 99/28013 | 6/1999 |
| WO | WO 99/46032 | 9/1999 |
| WO | WO 00/16425 | 3/2000 |
| WO | WO 00/16880 | 3/2000 |
| WO | WO 00/76628 A1 | 12/2000 |
| WO | WO 00/76630 | 12/2000 |
| WO | WO 01/47050 | 6/2001 |
| WO | WO 02/24309 | 3/2002 |
| WO | WO 02/35623 | 5/2002 |
| WO | WO 02/37590 | 5/2002 |
| WO | WO 02/45821 | 6/2002 |
| WO | WO 02/47797 | 6/2002 |
| WO | WO 02/056400 | 7/2002 |
| WO | WO 00/076628 | 12/2002 |
| WO | WO 03/077339 | 9/2003 |
| WO | WO 2004/030130 | 4/2004 |

OTHER PUBLICATIONS

Ding et al., *Chemical Engineering Science* 55:3461-3474, 2000, no month.
Ding et al., *Chemical Engineering Science* 55:3929-3940, 2000, no month.
Iyuke et al., *Chemical Engineering Science* 55:4745-4755, 2000, no month.
International Search Report from International Application No. PCT/CA99/00823, Feb. 2000.
International Search Report from International Application No. PCT/CA02/00368, Aug. 2002.
Office action dated Nov. 26, 2007 in U.S. Appl. No. 10/789,194.
Vaporciyan and Kadlec, "Periodic Separating Reactors: Experiments and Theory," *AIChE Journal* 35, pp. 831-844 (1989), no month.
Chatsiriwech et al., "Enhancement of Catalytic Reaction by Pressure Swing Adsorption," *Catalysis Today* 20, Elsevier Science, pp. 351-366 (1994), no month.
Hufton et al., "Sorption Enhanced Reaction Process for Hydrogen Production," *AIChE Journal*, vol. 45 No. 2, pp. 248-256 (Feb. 1999).
"Fuel Cells for Transportation 98," National Laboratory Annual Progress Report (1998), U.S. Department of Energy, Office of Advanced Automotive Technologies, "CO Clean-up R&D," Argonne National Laboratory, pp. 33-36, no month.
Carson et al., "Thermodynamics of Pressure Swing Adsorption (PSA) in the Recovery of Residual Hydrogen from SOFC Anode Gas," *Proceedings of the 30th Intersociety Energy Conversion Engineering Conference*, ASME, New York, New York, 3:229-234, 1995, no month.
International Search Report from International Application No. PCT/CA2003/000371 (Sep. 2004).
International Search Report from International Application No. PCT/CA2004/000289 (Dec. 2005).
Office action dated Jan. 4, 2007 in U.S. Appl. No. 10/789,194.

* cited by examiner

HYDROGEN RECYCLE FOR SOLID OXIDE FUEL CELL

PRIORITY CLAIM

This application claims priority to, and the benefit of, U.S. Provisional Application No. 60/364,771 filed Mar. 14, 2002, and U.S. Provisional Application No. 60/376,683 filed Apr. 29, 2002, both of which are incorporated herein by reference.

FIELD

This application is related to adsorptive gas separation, and in particular to rotary pressure swing adsorption (PSA) as utilized in fuel cell systems. This application also relates to co-pending, commonly-assigned, U.S. application Ser. Nos. 09/591,275, 09/808,715, and 10/039,940, the disclosures of which are incorporated herein by reference.

The present disclosure relates to solid oxide fuel cells (SOFCs) exploiting gas separation devices in which a first gas mixture including components A (for example hydrogen and B (for example carbon dioxide) is to be separated so that a first product of the separation is enriched in component A, while component B is mixed with a third gas component C (for example air, oxygen-enriched air or oxygen-depleted air) contained in a displacement purge stream to form a second gas mixture including components B and C, and with provision to prevent cross contamination of component C into the first product containing component A, or of component A into the second gas mixture containing component C. The system may be applied to hydrogen (component A) enrichment from fuel cell anode exhaust, where dilute carbon dioxide (component B) is to be rejected such as to the atmosphere by purging with cathode exhaust oxygen-depleted air (as component C).

BACKGROUND

Fuel cells provide an environmentally friendly source of electrical current. One type of high temperature fuel cell used for generating electrical power is the solid oxide fuel cell (SOFC). The SOFC includes an anode channel for receiving a flow of hydrogen gas (or a fuel gas which reacts in the anode channel to generate hydrogen by steam reforming and water gas shift reactions), a cathode channel for receiving a flow of oxygen gas, and a solid electrolyte which is a ceramic membrane conductive to oxygen ions and separates the anode channel from the cathode channel. Oxygen in the cathode channel dissociates to oxygen ions, which cross the electrolyte to react with hydrogen in the anode channel to generate a flow of electrons. As the hydrogen is consumed, carbon monoxide may be oxidized directly or may be shifted by steam to generate additional hydrogen. Carbon dioxide and water vapor are produced in the anode channel by oxidation of fuel components. Typical operating temperature of solid oxide fuel cells is about 500° to about 1000° C.

Except in the rare instance that hydrogen (e.g. recovered from refinery or chemical process off-gases, or else generated from renewable energy by electrolysis of water) is directly available as fuel, hydrogen must be generated from fossil fuels by an appropriate fuel processing system. For stationary power generation, it is preferred to generate hydrogen from natural gas by steam reforming or partial oxidation to produce "syngas" comprising a mixture of hydrogen, carbon monoxide, carbon dioxide, steam and some unreacted methane. As hydrogen is consumed in the fuel cell anode channel, much of the carbon monoxide reacts with steam by water gas shift to generate more hydrogen and more carbon dioxide. Other carbonaceous feedstocks (e.g. heavier hydrocarbons, coal, or biomass) may also be reacted with oxygen and steam to generate syngas by partial oxidation, gasification or autothermal reforming. The fuel cell may also be operated on hydrogen or syngas that has been generated externally.

An advantage of SOFC systems is that their high operating temperature facilitates close thermal integration between the fuel cell and the fuel processing system. The high temperature also allows the elimination of noble metal catalysts required by lower temperature fuel cells. However, prior art SOFC systems face challenging temperature regimes, and are disadvantaged by the degradation of cell voltages at very high temperatures under conventional operating conditions.

The lower heat of combustion of a fuel usefully defines the energy (enthalpy change of the reaction) that may be generated by oxidizing that fuel. The electrochemical energy that can be generated by an ideal fuel cell is however the free energy change of the reaction, which is smaller than the enthalpy change. The difference between the enthalpy change and the free energy change is the product of the entropy change of the reaction multiplied by the absolute temperature. This difference widens at higher temperatures, so higher temperature fuel cells inherently convert a lower fraction of the fuel energy to electrical power at high efficiency, while a larger fraction of the fuel energy is available only as heat which must be converted to electrical power by a thermodynamic bottoming cycle (e.g. steam or gas turbine plant) at lower efficiency.

Accumulation of reforming reaction products (carbon dioxide and steam) on the fuel cell anode opposes the electrochemical reaction, so that the free energy is reduced. Higher partial pressure of oxygen over the cathode, and higher partial pressure of hydrogen over the anode, drive the reaction forward so that the free energy is increased. Unfortunately, the reaction depletes the oxygen in the cathode channel and depletes hydrogen in the anode channel while rapidly increasing the backpressure of carbon dioxide as a diluent in the anode channel. Hence the free energy change is reduced, directly reducing the cell voltage of the fuel stack. This degrades the electrical efficiency of the system, while increasing the heat that must be converted at already lower efficiency by the thermal bottoming cycle.

The free energy change is simply the product of the electromotive force ("E") of the cell and the charge transferred per mole by the reaction ("2F"), where the factor of two reflects the valency of the carbonate ion. The following Nernst relation for a SOFC expresses the above described sensitivity of the electromotive force to the partial pressures of the electrochemical reactants in the anode and cathode channels, where the standard electromotive force ("Eo") is referred to all components at standard conditions and with water as vapor.

$$E = E_o - \frac{RT}{2F} \ln\left[\frac{P_{H2O(anode)}}{P_{H2(anode)} \cdot P_{O2(cathode)}^{0.5}}\right]$$

Adsorption gas separation systems have been considered in the prior art for manipulating partial pressures of reactants in the fuel cell, so as to achieve higher fuel cell voltage E.

According to prior known adsorptive processes, for enriching a component A of a feed gas mixture containing components A and B, an adsorbent material over which component B is more readily adsorbed and component A is less readily adsorbed may be provided. The adsorbent material contacts flow channels in adsorbers or adsorbent beds. When the gas mixture is introduced at a feed pressure and temperature to a first end of the adsorber during a feed step of the process, component B is preferentially adsorbed and a first product enriched in component A may be delivered from the second end of the adsorber as it becomes loaded with component B. The adsorber may then be regenerated to desorb component B in reverse flow so that the process may be repeated cyclically.

Regeneration of adsorbent materials may be achieved by alternative strategies including pressure swing, displacement purge, thermal swing, or combinations thereof, according to the prior art. It has also been claimed that regeneration of a carbon adsorbent loaded with carbon dioxide may be achieved by applying an electric current in so-called electric swing adsorption.

In existing pressure swing adsorption (PSA) systems or vacuum pressure swing adsorption systems (VPSA), the total pressure of the gas contacting the adsorber is reduced (pressure swing) following the feed step, thus reducing the partial pressure of component B contacting the adsorbent, and desorbing component B to be exhausted by purging with a reflux fraction of already enriched component A. The total pressure of the gas mixture in the adsorber is elevated while the gas flow in the adsorber is directed from the first end to the second end thereof, while the total pressure is reduced in the regeneration step while the gas flow in the adsorber is directed from the second end back to the first end. As a result, a "light" product (a gas fraction depleted in the more readily adsorbed component and enriched in the less readily adsorbed component A) is delivered from the second end of the adsorber, and a "heavy" product (a gas fraction enriched in the more strongly adsorbed component B) is exhausted from the first end of the adsorber.

Alternatively, the total pressure may be kept approximately constant in the regeneration step, while component B is desorbed by a third preferably less readily adsorbed component C, which was not part of the feed gas mixture, with component C introduced in reverse flow from the second end back to the first end of the adsorbers (displacement purge), thus reducing the partial pressure of component B contacting the adsorbent, and exhausting displaced component B from the first end of the adsorbers. As a result, a first or "light" product (a gas fraction depleted in the more readily adsorbed component B and enriched in the less readily adsorbed component A) is delivered from the second end of the adsorber, and a "heavy" product (a gas mixture including the more strongly adsorbed component B and the displacement component C) is exhausted from the first end of the adsorber.

Regeneration may also be achieved by cyclically raising the temperature (temperature swing) of the adsorbent so as to reduce the adsorptive affinity for all gas species, resulting in desorption of component B which can then be purged in reverse flow by a purge stream either as a reflux of previously enriched component A or by displacement purge with a component C. Thermal swing adsorption (TSA) requires bulk heating and cooling of the adsorbent on a cyclic basis, so is limited to relatively low cycle frequencies. The heating step may be achieved by heating the purge stream before admission to the second end of the adsorbers.

According to the prior art, pressure swing and displacement purge may be combined, so that a displacement purge regeneration step is achieved at a lower total pressure than the feed pressure. When relatively low cycle frequency necessary for operation of thermal swing adsorption processes may be acceptable, thermal swing may be combined with pressure swing and/or displacement purge regeneration strategies. The distinction of displacement purge processes in the present context is that the displacement purge stream is externally provided and includes a component C that is not contained in the feed gas mixture to be separated, unlike conventional PSA or TSA processes where the purge stream is typically obtained internally as a fraction of the feed gas mixture undergoing separation.

Previously, application of displacement purge processes has been limited by compatibility of components A, B and C. Even within the context of an overall separation being achieved, some intimate mixing will take place due to axial dispersion in the adsorbers, fluid holdup in gas cavities, and leakage across fluid seals and valves. While components B and C must obviously be compatible as they will be mixed as an intended outcome of the process, cross-contamination between components A and C would also take place so as to require compatibility of those components as well.

PSA is widely applied in hydrogen purification (e.g. from syngas generated by steam reforming or gasification of a hydrocarbon feedstock, after water gas shifting to minimize carbon monoxide concentration), with components A and B representing hydrogen and carbon dioxide respectively. In that application, displacement purge using air (or any oxygen-containing gas with oxygen appearing as a component C) would in the prior art have been impracticable owing to unacceptable hazards of cross-contamination between hydrogen and oxygen.

SUMMARY OF THE DISCLOSURE

The present disclosure addresses some of the limitations of the prior art in the application of gas separation systems to high temperature fuel cell systems.

In an embodiment of the present disclosure, a high temperature fuel cell electrical generation system is provided that is adapted to enable selective generation of electrical power, and/or hydrogen fuel, and/or useable heat, allowing flexible operation of the generation system wherein the generation system further incorporates means for mitigation of "greenhouse" gas and other environmentally deleterious gas emissions, and for enhancing overall efficiency of operation to increase sustainability of fuel resource use. In such an embodiment, the high temperature fuel cell may be a SOFC.

According to a first embodiment of the disclosed systems and processes, there is provided an electrical current generating system that includes at least one fuel cell operating at a temperature of at least about 250° C., a hydrogen gas separation system and/or oxygen gas delivery system that includes at least one device selected from a compressor or vacuum pump, and a drive system for the device that includes means for recovering energy from at least one of the hydrogen gas separation system, oxygen gas delivery system, or heat of the fuel cell. According to a second embodiment of an electrical current generating system according to the present disclosure, that also includes a high temperature fuel cell, a gas turbine system may be coupled to the hydrogen gas separation system or oxygen gas delivery system, wherein the gas turbine system may be powered by energy recovered from at least one of the hydrogen gas separation system, oxygen gas delivery system, or heat of the fuel cell. The hydrogen gas separation system or the oxygen gas delivery system may include an adsorption module, such as a pressure swing adsorption module. These generating systems are particularly useful for use in conjunction with solid oxide fuel cells.

The present disclosure is concerned with gas separation for application within a high temperature fuel cell system, and more particularly with adsorptive separation of a first gas mixture containing less readily adsorbed first component (or fraction) A and more readily adsorbed second component (or fraction) B, with adsorber regeneration achieved by displacement purge, preferably in combination with pressure swing or thermal swing regeneration techniques. The displacement purge stream includes a preferably less readily adsorbed third component (or fraction) C which may be mixed with component B in the regeneration step. A particular requirement for safe use of a gas separation system for use in a high temperature fuel cell system may include means to avoid or strictly minimise any mixing between components A and C in externally delivered or discharged gas streams. This requirement arises in fuel cell and other applications where components A and C may be incompatible or mutually chemically reactive, such as when component A is a combustible fuel and component C is an oxidant. Other applications also are contemplated where component C may act detrimentally to a system for A in a downstream process, or vice versa.

Thus, a first gas mixture including components A and B is to be separated so that a first product of the separation is enriched in component A, while component B is mixed with a third gas component C contained in a displacement purge stream to form a second gas mixture including components C and B, and with provision to prevent cross contamination of component C into the first product containing component A, or of component A into the second gas mixture containing component C. It is may be desirable that such cross contamination be avoided and/or at least strictly minimised for safety or other reasons. Component C may be a major or minor constituent of the purge gas stream.

An apparatus embodiment according to the present disclosure includes a co-operating set of N adsorbers, each adsorber having a flow path between first and second ends of the adsorber, and the flow path contacting an adsorbent material within the adsorber, with component B being more readily adsorbed relative to components A and C which are less readily adsorbed by the adsorbent material. The adsorbers may be subjected to a cyclic adsorption process with process steps as set forth below, with a cycle period T and with the N adsorbers sequentially undergoing the steps of the cycle sequentially in staggered phase so that the process is substantially continuous.

The process for each adsorber includes a feed step in which the first gas mixture is admitted at a first total pressure to a first end of the adsorber, while a first or "light" product gas enriched in component A is delivered from a second end of the adsorber as component B is preferentially adsorbed on the adsorbent contacting the flow channel(s) of the flow path within the adsorber. The process also includes a displacement purge step in which displacement purge gas containing component C is admitted to one end of the adsorber, while a second gas mixture (or "heavy" product gas) is delivered at a second total pressure from the other end of the adsorbers as component B desorbs from the adsorbent. The first and second pressures may be substantially similar, or the second pressure may be substantially less than the first pressure so as to obtain a pressure swing component for the separation process. Also, the temperatures of the components may vary, such as component C being at a higher temperature than other components, so as to obtain a temperature swing component for the separation process. In such cases where the pressure and/or temperature of the first product gas and second gas mixture are varied, such variations may be employed to increase the overall efficiency of the separation process.

In an aspect where gas components A and C are incompatible, immediately prior to the displacement purge step, a first "buffer" step is performed in the inventive disclosed process, in order to remove interstitial and adsorbed component A accumulated in the adsorber from the previous feed step, so as to avoid contamination of the second gas mixture (containing components B and C) to be produced in the imminent displacement purge step by component A. Likewise, immediately following the displacement purge step, a second "buffer" step is performed in the inventive disclosed process, in order to remove interstitial and adsorbed component C accumulated in the adsorber from the previous feed purge step, so as to avoid contamination of the first product gas to be produced in the following feed step by component C.

The buffer steps according to of the present aspect of the disclosure invention may be accomplished in several ways, including applications of the displacement purge principle by introducing a buffer sweep stream, optionally assisted by reducing the total pressure (e.g. by a modest vacuum) or by varying the temperature of the buffer sweep stream during the buffer steps, such as by reducing the temperature of the buffer gas relative to the feed and or purge gases. Typically, each buffer step will generate an exhaust stream, in which there may be some admixture of components A and C; and such buffer step exhaust streams may be subjected to further processing (such as by combustion to eliminate any unreacted mixture of A and C) for disposal. Buffer sweep gas to achieve displacement purge in the buffer steps may be provided as any less readily adsorbed gas stream. The first buffer sweep gas for a first buffer step preferably should not contain unbound component A, and the second buffer sweep gas for a second buffer step preferably should not contain unbound component C. The first buffer sweep gas may be or may contain displacement purge gas containing component C. The second buffer sweep gas may be or may contain first gas mixture containing component A.

The buffer sweep gas for either buffer step may be selected to be an inert gas, which may be flue gas recycled from combustion of the buffer sweep gas under combustion conditions for each stream such that A is removed from sweep gas for a first buffer step, and C is removed from sweep gas for a second buffer step. Alternatively, any other available less adsorbed gas not containing A or C may be used as a buffer sweep gas. For higher temperature applications, steam may be used as buffer sweep gas.

The total pressure may be reduced (e.g. below the second pressure at which the displacement purge step is conducted) during the buffer steps is desirable to assist the removal of components A or C to be purged, and also to avoid any leakage (external to the adsorbers) of components A or C between process steps preceding and following each buffer step. With reduced total pressure in a first buffer step, desorbing component B may assist the purging of component A during that first buffer step. Hence, a minor pressure swing to reduce the total pressure during buffer steps, by a modest level of vacuum if the second pressure is substantially atmospheric, may be used to enhance the reliability of the buffer steps, independently of whether a larger pressure swing is applied to assist the enrichment of component A. Similarly, a minor temperature swing may be implemented during buffer steps to assist in purging of the relevant component, and to thereby enhance the reliability of the buffer step, or alternatively to enhance the efficiency of the following adsorption or desorption step.

If the first pressure is much larger than the second pressure, the process will include additional steps as provided in well-known pressure swing adsorption processes for the depressurization of the adsorber after a feed step and before the first buffer step, and for repressurization of the adsorber after the second buffer step and before the next feed step. Depressurization steps may include co-currrent and/or countercurrrent blowdown steps. Repressurization steps may include backfill and feed pressurization steps. Depressurization and repressurization steps may be achieved by single or plural pressure equalization steps performed between out-of-phase adsorbers by providing fluid communication between the first or second ends of adsorbers undergoing a pressure equalization step.

In the case that pressure swing is combined with displacement purge in the presently disclosed process, it will be understood for greatest generality that any of the steps known for PSA and VPSA processes may be incorporated in the present process, which is characterized by the first and second buffer steps respectively just before and just after the displacement purge step. If desired, a purge step using light product gas or co-currrent blowdown gas as purge gas may be conducted in addition to (and before or after) the displacement purge step. Similarly in the case that temperature swing is combined with displacement purge in the presently disclosed process, it will be understood for greatest generality that any of the steps known for TSA processes may be incorporated in the present process, given that the present process is characterized by the first and second buffer steps respectively just before and just after the displacement purge step.

According to an embodiment of the disclosure, in order to perform the buffer steps with minimal losses of components A and C during those steps, it is desirable that components A and C (and any buffer sweep component D) be weakly adsorbed, and that the number N of adsorbers be relatively large with each adsorber thus having a small inventory of adsorbent material, so that the buffer steps may occupy only a small fraction of the cycle period T.

An apparatus embodiment according to an aspect of the present disclosure of the invention includes a first valve means communicating to a first end and a second valve means communicating to a second end of each adsorber, so as to perform in sequence for each adsorber the complete cycle of the feed step, any depressurization steps, the first buffer step, the displacement purge step, the second buffer step, and any repressurization steps.

Multiple directional valve configurations known in the art (e.g. as used in PSA systems) may be used to control gas flows to and from the adsorbers in apparatus embodiments according to the present disclosure. In a particular embodiment of the disclosure, preferred embodiments use rotary distributor valves are used as the first and second valve means. In such an embodiment, N adsorbers are preferably mounted as an array in a rotor engaged in fluid sealing contact on first and second valve faces with a stator. The gas separation apparatus of the such an embodiment may invention will then be referred to as a rotary adsorption module ("RAM").

The rotor of a rotary adsorption module embodiment for use in the disclosed systems and processes includes a plurality of flow paths for receiving adsorbent material therein for preferentially adsorbing a first gas component in the flow paths relative to a second gas component. The gas separation system also may include compression machinery coupled to the rotary module for facilitating gas flow through the flow paths for separating the first gas component from the second gas component. The stator includes a first stator valve surface, a second stator valve surface, and plurality of function compartments opening into the stator valve surfaces. The function compartments include a gas feed compartment, and a light gas component exit compartment, and a buffer gas compartment. "Light gas" refers to withdrawn gas enriched in the second, less readily adsorbed component, which is typically withdrawn from the second ends of adsorbers via the second valve means. However, in some processes according to the present disclosure which are adapted for implementation with the above described rotary module embodiment, feed gas mixture may enter the adsorbent beds at the second end of the adsorbers via the second valve means, and light product gas may be withdrawn at the first end. Similarly, any buffer or purge steps incorporated in such processes may be performed in either direction by admitting buffer or purge gas to either the first or second end of an adsorber. In the case where the disclosed rotary module is operated utilizing a gas separation process including a substantial pressure swing component, in addition to displacement purge, the function compartments may additionally include light reflux exit and return or other compartments to conduct light reflux, blowdown, pressurization or other gas flows related to the pressure swing component of the gas separation process to and from the adsorbers. Any such gas flows, in addition to product, buffer or purge gas flows may also be transferred from one adsorber to another, for flow through the receiving adsorber in either direction, by means of fluid connection means extending between the respective function compartments opening into the first and second stator valve faces. Such inter-adsorber transfer of gas flows may be utilized for example to recycle buffer gas flows between adsorbers to effectively enhance recovery of product gas components (A and B) by capturing product flows expelled from the adsorbers at the onset of a buffer step (instead of exhausting those flows to the atmosphere), and to reduce the volume of buffer gas required to perform the buffer steps. Additionally, recycling of buffer gas flows expelled at the onset of subsequent feed or purge steps in some embodiments of the presently disclosed processes enables the reduction of residual buffer gas remaining in adsorbers following a buffer step that may be delivered in product gas flows (containing product components A or B), thereby increasing the purity of product gas flows, and reducing any buildup of buffer gas component in cases where product gas components may be recycled through downstream systems or processes, such as the fuel loop of an SOFC.

The rotary adsorption module may itself operate at an elevated working temperature. For example, the operating temperature of the adsorbers may range from approximately ambient temperature to an elevated temperature up to about 450° C., as may be facilitated by recuperative or regenerative heat exchange between the feed gas mixture and the displacement purge and/or buffer streams. The rotary adsorption module may be operated to support a temperature gradient along the length of the flow channels, so that for example the temperature at the first end of the adsorbers is higher than the temperature at the second end of the adsorbers. As used herein, "operating temperature of the adsorbers"

denotes the temperature of a gas flowing through the adsorbers and/or the temperature of the adsorber beds.

In a further apparatus embodiment of the disclosure, a rotary adsorption module is provided that is adapted to enable separation of a feed gas mixture containing weakly adsorbed component A and relatively strongly adsorbed component B, and additionally another component E which is similarly adsorbed, or even more strongly adsorbed than component B, where it is desired to deliver enriched component A in combination with component E, and separate from a product stream including component B. The rotary adsorption module includes a rotor and stator, and associated function compartments, as in the previous module embodiment described above, and additionally includes a second separate set of adsorbers in the rotor module, and associated second separate set of function compartments opening into the stator valve surface, including at least a feed gas compartment, and product gas exit compartment. The adsorbent material in the second set of adsorbers is chosen to preferentially adsorb component E relative to components A and B, so that initial feed gas containing components A, B, and E may be admitted to the second set of adsorbers through the second set of function compartments first, in order to separate component E, and provide a second feed gas mixture substantially free of component E to the first set of adsorbers through the first set of function compartments, for separation of components A and B using displacement purge gas component C as discussed in the previous embodiment. Following separation of components A and B, the resultant product gas enriched in component A may be admitted to the second set of adsorbers which have been previously loaded with adsorbed component E, for desorption of component E to produce a product stream containing enriched components A and E for external delivery and use. As described in the previous module embodiment above, in cases where components A and C are incompatible, a buffer gas component D may be used to sweep remnants of components A and C from the first set of adsorber beds prior to and after displacement purge steps. Further, as also described above, additional steps may be added to the separation of components A and B to implement a pressure swing or temperature swing component to the separation process, using such optional additional function compartments as described above for transferring such gas flows between adsorbers of the first set. Similarly, additional steps may be added to the separation of component E from the feed gas, in order to implement a pressure or temperature swing component to the separation, and such additional function compartments as may be necessary to transfer such gas flows between adsorbers of the first set may be included in the second set of function compartments opening into the stator valve surface. Further, as in the previous embodiment described above, gas flows through adsorbers may occur in either direction, and may be transferred between first and second ends of adsorbers, in order to provide for recycling of buffer gas flows, for example. In the present apparatus embodiment, the first and second sets of adsorbers, and corresponding sets of function compartments may be spatially arranged within the rotor and stator assemblies respectively in any configuration suitable to allow for the necessary transfer of gas streams between the adsorber sets as described above. Possible configurations include coaxial annular arrangement such that the first and second sets of adsorbers and function compartments form 2 separate annular units spaced radially from each other around a common central axis.

An exemplary application of the above two apparatus embodiments is disclosed, directed to hydrogen (component A) enrichment from syngas mixtures as the first gas mixture, where dilute carbon dioxide (component B) is to be separated, typically for rejection directly to the atmosphere, and with air or preferably nitrogen-enriched air as the displacement purge stream containing oxygen (component C). The presently disclosed apparatus allows exploitation of the fact that air contains only trace quantities of carbon dioxide to use air or preferably nitrogen-enriched air as the displacement purge stream to strip carbon dioxide from a syngas stream at low pressure, and thus achieve useful hydrogen enrichment without compression to elevated pressures. In a case where water vapor (component E) is present in the feed gas in substantial amounts, and it is desired to deliver the water vapor in the same purge stream exhaust along with carbon dioxide and purge gas, an adsorption module with one set of adsorbers may be used, and the adsorbent material in the adsorbers would typically be selected from those known in the art as effective to separate carbon dioxide in the presence of significant levels of water vapor, particularly in applications where the separation is performed at elevated temperature. The buffer gas (component D) may be selected from any available less-adsorbed gas not containing component A or C, and which is compatible with components A and C, including for example inert gases. Without the buffer steps and other features of the presently disclosed apparatus to prevent cross-contamination between oxygen and fuel components including hydrogen in this exemplary application, the use of air or nitrogen-enriched air to purge hydrogen enrichment adsorbers would not usually be contemplated in view of safety concerns. In a case where water vapor (component E) is present in substantial amounts, and it is desired to deliver the water vapor in combination with the enriched hydrogen product, an adsorption module with two sets of adsorbers may be used, wherein the adsorbent in the first adsorber set would typically be selected from those known in the art to preferentially adsorb carbon dioxide over hydrogen at the operational temperature of interest, and the adsorbent in the second adsorber set would typically be selected from those know to preferentially adsorb water vapor over both carbon dioxide and hydrogen at the operational temperature of interest.

In the above exemplary application for separation of syngas feed gas mixtures near ambient temperature, suitable known adsorbents include activated alumina, alumina gel and silica gel for adsorption of water vapor, and activated carbons, hydrophilic zeolites (e.g. type 13X zeolite and many other zeolites known in the art), and hydrophobic zeolites (e.g. type Y zeolite or silicalite) for adsorption of carbon dioxide. If the displacement purge stream is itself humid, it may be advantageous to use relatively hydrophobic adsorbents such as active carbons and zeolites such as Y-zeolite or silicalite. Alternatively, the adsorbent in the rotary adsorption module may be chosen to be selective at an elevated operating temperature (e.g., about 250° C. to about 400° C.) for particular components of the gas mixture to be separated. For example, in the above described application for the separation of moist syngas, the adsorbent may be chosen to be selective for carbon dioxide in preference to water vapor. Suitable such adsorbents known in the art include alkali-promoted materials. Illustrative alkali-promoted materials include those containing cations of alkali metals such as Li, Na, K, Cs, Rb, and/or alkaline earth metals such as Ca, Sr, and Ba. The materials typically may be provided as the hydroxide, carbonate, bicarbonate, acetate, phosphate, nitrate or organic acid salt compound of the alkali or alkaline earth metals. Such compounds may be deposited on any suitable substrate such as alumina.

Examples of specific materials for elevated temperature operation includes alumina impregnated with potassium carbonate and hydrotalcite promoted with potassium carbonate, as disclosed in the prior art.

While the adsorbent employed in the adsorbers according to the disclosure may be conventional granular forms of adsorbent, it has been found to be advantageous within the disclosed apparatus and process embodiments that the adsorbent materials be supported in a parallel passage monolith of high surface area, so that the process may be conducted at relatively high cycle frequency (e.g. cycle period of about 1 second to about 10 seconds) in a compact apparatus which contains only a small inventory of adsorbent and consequently of components A and B which may be mutually chemically reactive. It has been found to be particularly advantageous that the adsorbent be supported as a laminated sheet structure ("adsorbent laminate") on thin substrate sheets with spacing means between the sheets to separate the sheets and form flow passages. Further details relating to the selection and construction of suitable such adsorbent laminates may be found in the commonly assigned copending U.S. patent application Ser. No. 10/041,536 which is hereby incorporated by reference. It has been found that for use in the presently disclosed systems and processes (gas separation by displacement purge-based process) adsorbent laminate structures having relatively low void fractions (from about 10%-50% of structure volume) and relatively low pressure drop (compared to similarly sized adsorbers incorporating conventional beaded adsorbents) are advantageous. The void fraction, adsorbent loading density and pressure drop characteristics of an adsorbent laminate structure as disclosed above may be varied according to the feed, purge and buffer gas compositions, adsorbent materials selected and process requirements by selecting the thickness of laminate sheets and spacing means used to form the laminate structure, unlike the relatively fixed void fraction (approximately 33%) of adsorbers incorporating conventional beaded adsorbents. It has further been found that for use in the presently disclosed systems and processes, especially in the cases where feed gas component B is somewhat weakly adsorbed on the adsorbent material in use, or where a buffer gas is used to prevent mixing of components A and C, adsorbent laminate structures with void ratios in the range of about 20%-30%, and relatively low pressure drops are particularly advantageous. Suitable adsorbent laminate structures for use in the disclosed systems and processes may be formed using thin metallic substrate materials, such as for example stainless steel mesh from about 100-300 microns thick, which may be combined with similar metallic mesh or expanded metal foil materials as spacing means between adsorbent layers. Laminate structures formed from such metallic substrate and spacer materials typically possess a relatively high thermal mass, and may provide advantageous function as an effective flame arrestor to suppress any accidental reaction between mutually reactive components A and C that may occur as the result of any mechanical or structural failure of the apparatus. Alternatively, suitable adsorbent laminate structures for use in the disclosed systems and processes may be formed using thin composite substrate materials, such as for example fibreglass mesh or scrim from about 100-300 microns thick, which may be combined with ceramic printed or other non-metallic spacing materials between adsorbent layers. Such laminate structures typically possess a relatively low thermal mass, and may facilitate rapid changes in temperature within an adsorber, which is advantageous in disclosed systems incorporating a gas separation process with a temperature swing component operating at relatively high cycle speeds.

In a further application of the presently disclosed systems and processes, anode exhaust gas from solid oxide fuel cells (SOFC) contains carbon dioxide and steam with unreacted fuel components including hydrogen and carbon monoxide. A SOFC power plant also has an available stream of nitrogen-enriched air as the cathode exhaust stream, or from a vacuum exhaust of an oxygen VPSA unit which may be used to deliver enriched oxygen to the cathode inlet for enhanced voltage efficiency and other benefits. In such a SOFC system, it is desirable to improve overall efficiency by separating, enriching, and recycling hydrogen to the fuel cell anode inlet. In an embodiment of the present disclosure, after water gas shifting to convert most carbon monoxide to hydrogen (component A) and carbon dioxide (component B), optionally after at least partial removal of water vapor, the SOFC anode exhaust gas may be introduced to a rotary adsorption module (as described above) as a feed gas mixture, while nitrogen-enriched air may be used as a displacement purge gas (component C). If the nitrogen-enriched air used as a displacement purge gas is the exhaust from an oxygen VPSA providing enriched oxygen to the SOFC cathode, a single vacuum pump may be used to draw a second exhaust gas mixture (comprising exhaust carbon dioxide and oxygen-depleted air) from the exhaust outlet of the rotary adsorption module, thus providing a pressure swing vacuum for both the oxygen VPSA and the hydrogen-enrichment rotary adsorption module.

Industrial H2 PSA is normally conducted at considerably elevated pressures (>10 bars) to achieve simultaneous high purity and high recovery (~80%-85%). The feed gas mixture must be supplied at elevated pressure in order to deliver hydrogen (component A) at substantially the feed pressure, while also delivering carbon dioxide (component B) at an exhaust partial pressure of approximately one bar. If the carbon dioxide is being exhausted to the atmosphere, this represents a major loss of energy due to lost free energy of mixing as the carbon dioxide is diluted to its ambient partial pressure of about 0.00035 bars. The present systems and processes may be employed to exploit the fact that air contains only trace quantities of carbon dioxide to use air or preferably nitrogen-enriched air as the displacement purge stream to strip carbon dioxide from a syngas stream at low pressure, and thus achieve useful hydrogen enrichment without compression to elevated pressures. Free energy is thus captured from dilution of carbon dioxide which may be discharged directly into the atmosphere.

In application to advanced power generation technologies such as solid oxide fuel cells, it will be appreciated that overall efficiency can be unexpectedly increased by implementing systems and processes according to the present disclosure which may be used to enable recycle of enriched hydrogen to the SOFC anode while diluting carbon dioxide into the atmosphere, thus capturing extra free energy beyond that normally credited to a combustion process with carbon dioxide delivered at a reference pressure of one bar. Without the buffer steps and other features of the disclosed systems and processes to prevent cross-contamination between oxygen and fuel components including hydrogen, use of air or even nitrogen-enriched air to purge hydrogen enrichment adsorbers would not usually be contemplated in view of safety concerns.

In a further embodiment according to the present disclosure, there is provided an electrical current generating system that includes a SOFC, and a H2 enrichment rotary adsorption module coupled to the SOFC. Solid oxide fuel cells may be designed to operate at any pressure, with working pressures of about 1 bars to 5 bars being preferred in presently disclosed systems. The present disclosure particularly applies to high temperature SOFC fuel cell power plants using a hydrocarbon fuel such as natural gas. In an additional embodiment, before being admitted to the fuel cell anode channel inlet, the fuel may be mixed with hydrogen rich gas separated by a first rotary adsorption module from the anode exhaust gas, with the separation preferably performed after the anode exhaust gas has been subjected to post-reforming and water gas shift reaction steps so as to elevate the hydrogen concentration therein while oxidizing carbon monoxide to carbon dioxide.

In the important case of natural gas as the hydrocarbon fuel, the anode feed gas desirably comprises a mixture including methane and a large excess of recycled hydrogen. The excess hydrogen inhibits soot deposition by the methane cracking reaction, thus allowing safe operation of the SOFC with a minimum amount of steam in the anode feed gas. The amount of steam in the anode feed gas may be very low or even substantially zero if the recycle hydrogen concentration is maintained at a high level (e.g. about 85-90% of the anode feed gas). Benefits of minimum steam concentration in the anode feed gas include:

1. high initial ratio of H2 to H2O elevates the Nernst potential to improve voltage efficiency and output.
2. methane acts as a chemical sink for fuel cell reaction H2O by steam reforming, thus helping maintain a high ratio of H2 to H2O along the anode channel.
3. methane conversion to CO and H2 is delayed along the anode channel as H2O is supplied by the fuel cell oxidation reaction, thus alleviating steep temperature gradients that would result from overly rapid endothermic steam reforming at the anode entrance.
4. low steam concentration inhibits conversion of CH4 and CO to CO2, thus ensuring that the steam reforming reaction within the anode channel is most highly endothermic to take up fuel cell waste heat for improved overall heat balance.

By contrast, prior art internally reforming SOFC fuel cells typically operate with a substantial steam/carbon ratio in the anode feed gas to suppress carbon deposition, thus depressing fuel cell voltage performance. This prior art approach typically requires pre-reforming of a substantial fraction of the fuel natural gas to avoid excessive cooling at the anode entrance and steep temperature gradients, that would result from overly rapid endothermic steam reforming as the fuel enters the anode channel.

The anode exhaust gas typically contains some unreacted methane as well as a considerable fraction of carbon monoxide. The presently disclosed systems and processes provide optionally that steam may be added to the anode exhaust gas which is then admitted at elevated temperature to an adiabatic post-reformer, simultaneously performing the endothermic steam reforming reaction with the exothermic water gas shift reaction so that external heat exchange for the post-reformer is not needed.

The foregoing features and advantages will become more apparent from the following detailed description of several embodiments that proceeds with reference to the accompanying figures.

BRIEF DESCRIPTION OF THE DRAWINGS

Certain embodiments are described below with reference to the following figures.

DETAILED DESCRIPTION OF SEVERAL EMBODIMENTS

FIGS. 1-4

A hydrogen-enrichment rotary adsorption module with displacement purge regeneration is described below in connection with FIGS. 1-4. As used herein, a "rotary adsorption module" includes, but is not limited to, either a device wherein an array of adsorbers rotates relative to a fixed valve face or stator or a device wherein the valve face or stator rotates relative to an array of adsorbers. Illustrated embodiments have the adsorbers mounted in a rotor, with the rotor in a housing which is a stator with fixed valve faces.

Figure 1:
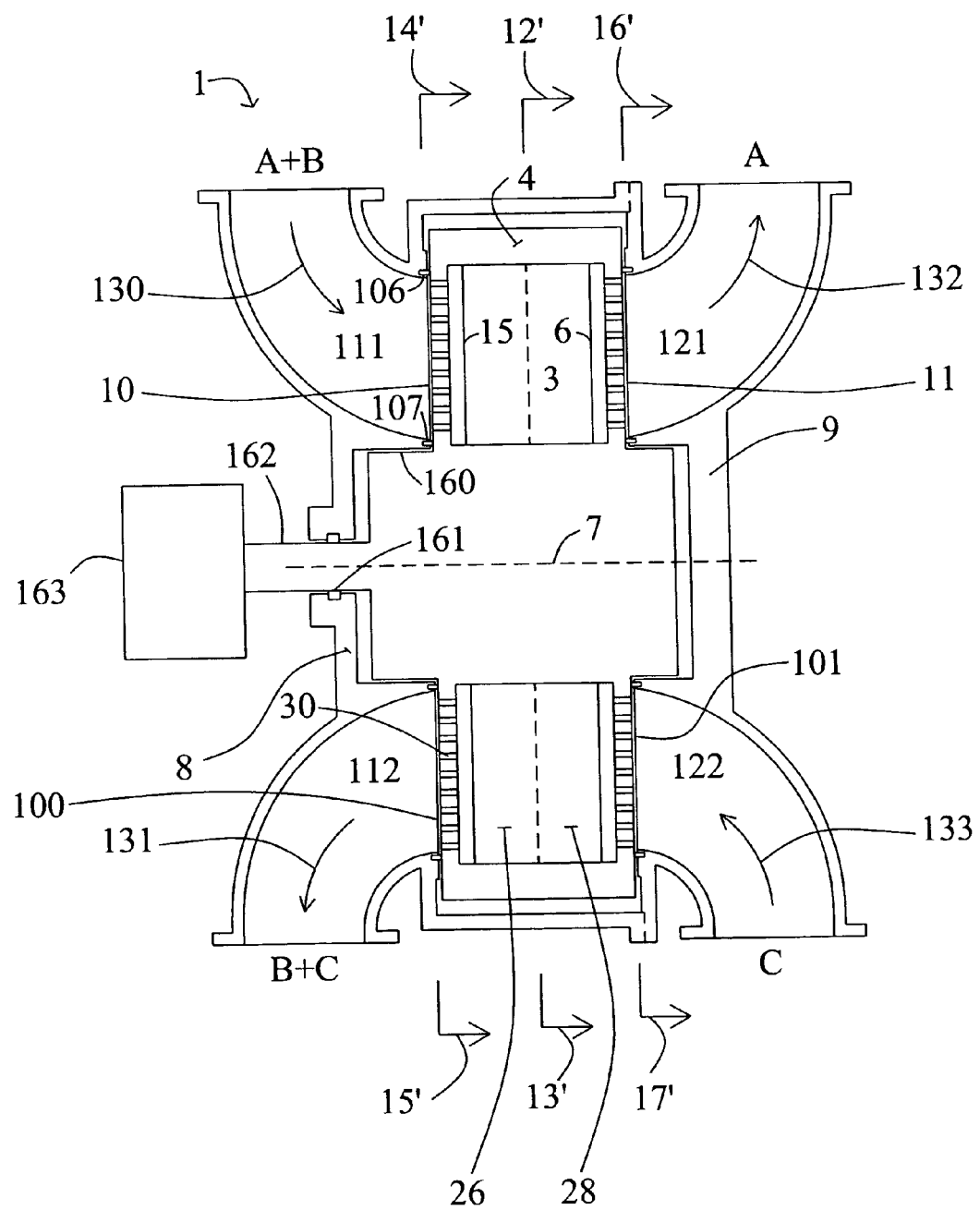
FIG. 1 shows an axial section of a rotary adsorption module.

FIG. 1 shows a rotary adsorption module 1, which includes a number "N" of adsorbers 3 or adsorber channels 3 in adsorber housing body 4. Each adsorber has a first end 5 and a second end 6, with a flow path therebetween contacting an adsorbent over which a gas component B is more readily adsorbed relative to a component A and a component C which are less readily adsorbed. The adsorbers are deployed in an axisymmetric array about axis 7 of the adsorber housing body. The housing body 4 is in relative rotary motion about axis 7 with first and second functional bodies 8 and 9, being engaged across a first valve face 10 with the first functional body 8 to which a first gas mixture containing components A and B is supplied in a first sector and from which a second gas mixture containing components B and C is withdrawn from a second sector, and across a second valve face 11 with the second functional body 9 from which a first or light product enriched in component A is withdrawn in a first sector and to which a displacement purge stream containing component C is supplied in a second sector.

In embodiments as particularly depicted in FIGS. 1-5, the adsorber housing 4 rotates and shall henceforth be referred to as the adsorber rotor 4, while the first and second functional bodies are stationary and together constitute a stator assembly 12 of the module. The first functional body shall henceforth be referred to as the first valve stator 8, and the second functional body shall henceforth be referred to as the second valve stator 9. In other embodiments, the adsorber housing 4 may be stationary, while the first and second functional bodies are rotary distributor valve rotors.

In the embodiment shown in FIGS. 1-4, the flow path through the adsorbers is parallel to axis 7, so that the flow direction is axial, while the first and second valve faces are shown as flat annular discs normal to axis 7. However, more generally the flow direction in the adsorbers may be axial or radial or a combination thereof, and the first and second valve faces may be shaped according to any figure of revolution centred on axis 7, including planar, conical, cylindrical, etc. The steps of the process and the functional compartments to be defined will be in the same angular relationship regardless of a radial or axial flow direction in the adsorbers.

Figure 2:
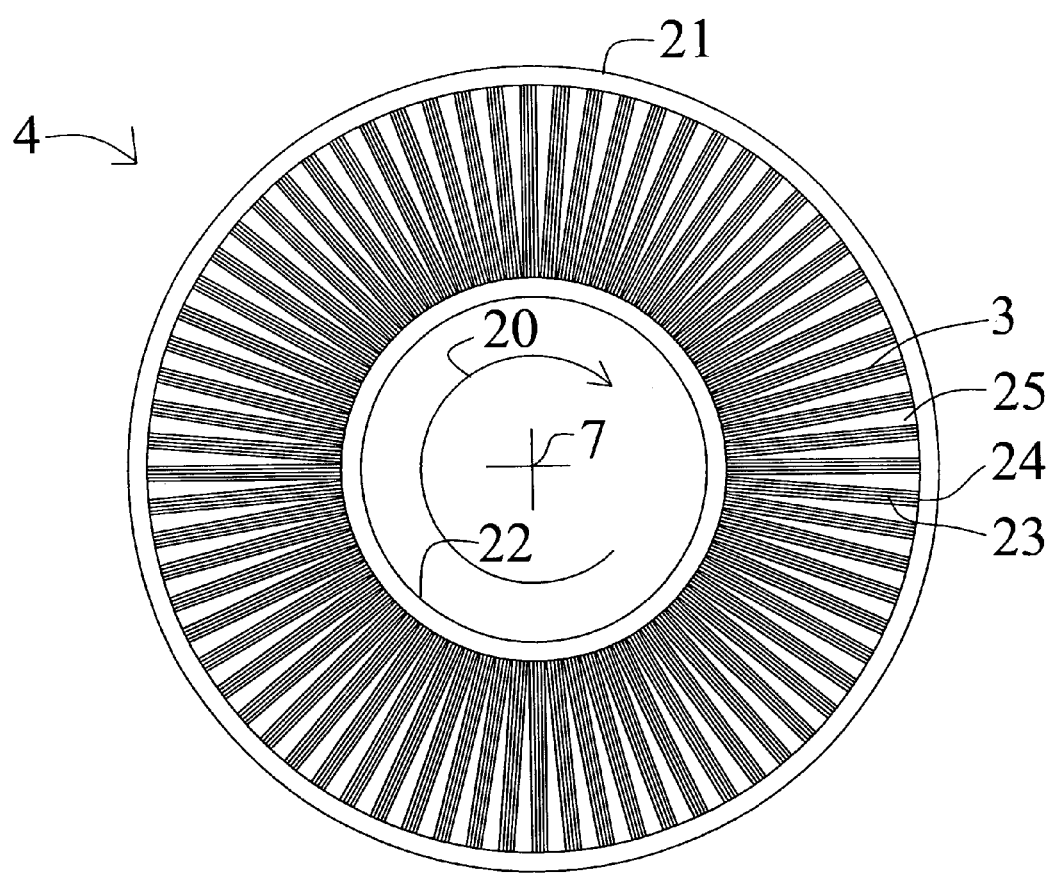
FIGS. 2 through 4 show transverse sections of the module of FIG. 1.
Figure 3:
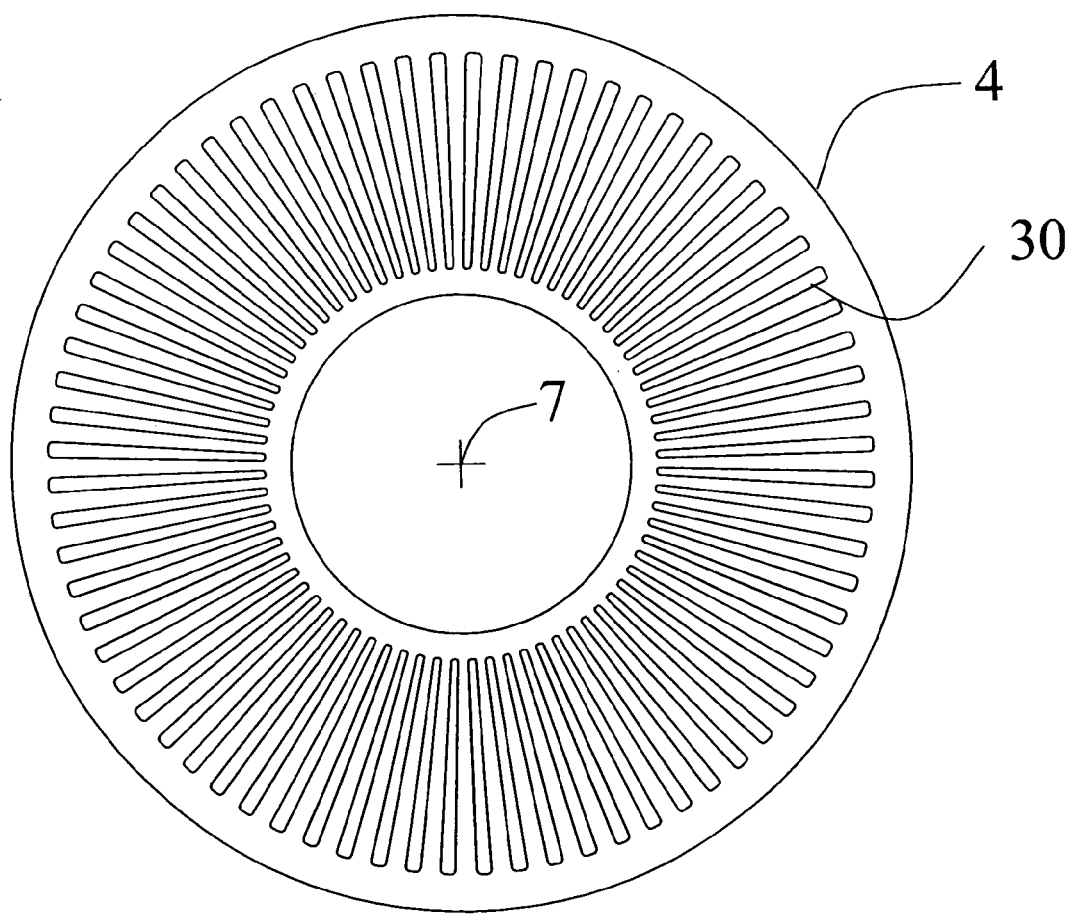
Figure 4:
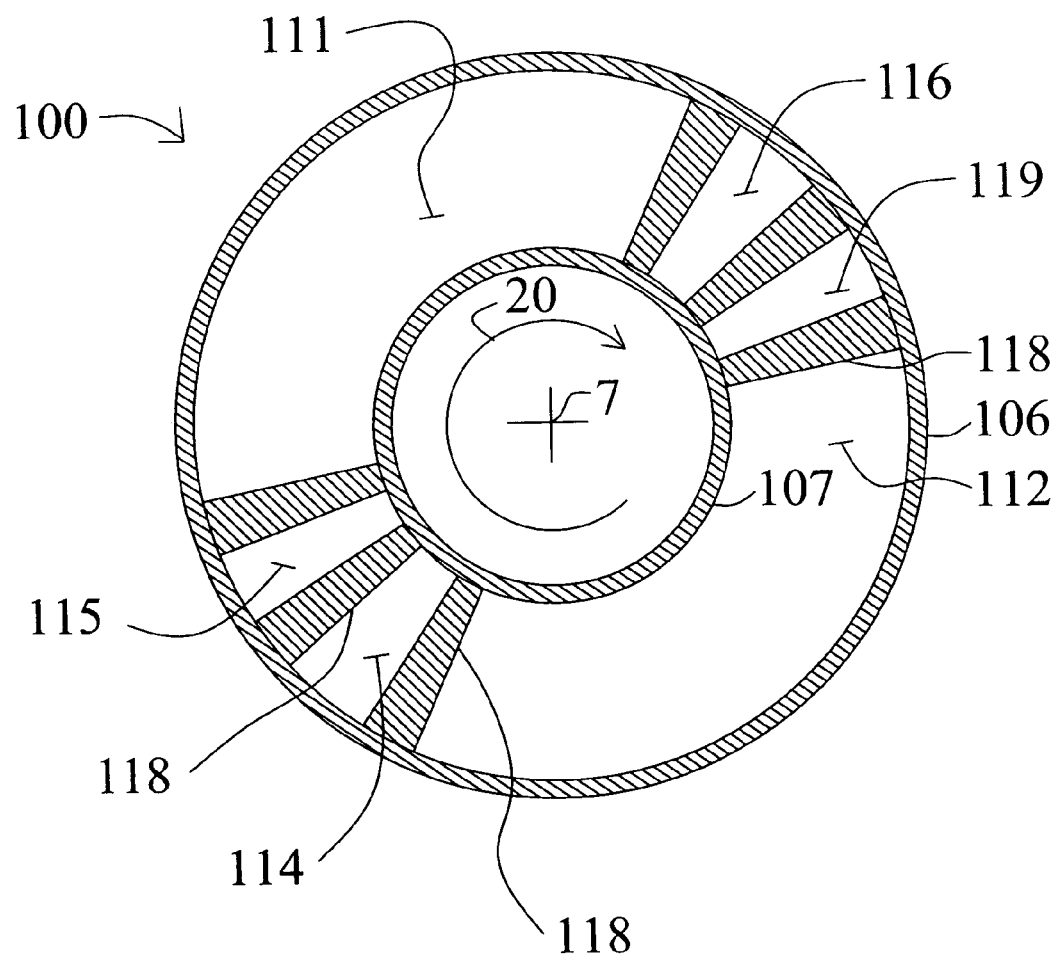

FIGS. 2-4 are cross-sections of module 1 in the planes defined by arrows 12'-13', 14'-15', and 16'-17'. Arrow 20 in each section shows the direction of rotation of the rotor 4.

FIG. 2 shows section 12'-13' across FIG. 1, which crosses the adsorber rotor. Here, "N"=72. The adsorbers 3 are mounted between outer wall 21 and inner wall 22 of adsorber wheel 208. Each adsorber in the particular embodiment depicted comprises a rectangular flat pack 3 of adsorbent sheets 23, with spacers 24 between the sheets to define flow channels here in the axial direction. Separators 25 are provided between the adsorbers to fill void space and prevent leakage between the adsorbers. The packs 3 may be radially tapered to improve the volume packing of adsorbent. In alternative embodiments, the adsorbers may comprise multiple layers of adsorbent laminate oriented in a concentric spirally wrapped configuration, or other suitable monolithic structure, or alternatively may compose beaded or other particulate adsorbent arrangements.

As shown in FIG. 1, the adsorbers 3 may include a plurality of distinct zones between the first end 5 and the second end 6 of the flow channels, here shown as two zones respectively a first zone 26 adjacent the first end 5 and a second zone 28 adjacent the second end 6. As an alternative to distinct zones of adsorbents, the different adsorbents may be provided in layers or mixtures that include varying gradients of adsorbent concentrations along the gas flow path. The transition from one adsorbent to another may also be a blended mixture of the two adsorbents rather than a distinct transition. A further option is to provide a mixture of the different adsorbents that may or may not be homogeneous.

In the case of a H2 adsorption separator operating at ambient temperature up to about 250° C., a first zone may contain an adsorbent or desiccant selected for removing very strongly adsorbed components of the feed gas mixture, such as water or methanol vapor, and some carbon dioxide. A second zone may contain an adsorbent typically selected for bulk separation of carbon dioxide.

In the case of a H2 PSA operating at about 250° C. to about 500° C., a first zone may contain an adsorbent that preferentially adsorbs CO2 relative to water vapor as described above. A second zone may contain an adsorbent (e.g., zeolite, Cu(I)-containing material, or Ag(I)-containing material) that preferentially adsorbs CO relative to water vapor. According to one version, the CO2-selective adsorbent and the CO-selective adsorbent may be included or mixed together in a single zone rather than in two distinct zones.

The adsorbent sheets comprise a reinforcement material or substrate (e.g., glass fibre, metal foil or wire mesh) to which the adsorbent material is attached with a suitable binder. Satisfactory adsorbent sheets have been made by coating a slurry of zeolite crystals with binder constituents onto the substrate, with successful examples including non-woven fibreglass scrims, woven metal (wire mesh) fabrics, and expanded aluminium foils. Spacers may be provided by printing or embossing the adsorbent sheet with a raised pattern, or by placing a fabricated spacer between adjacent pairs of adsorbent sheets. Alternative satisfactory spacers have been provided as woven metal (wire mesh) screens, non-woven fibreglass scrims, and metal foils with etched flow channels in a photolithographic pattern. Adsorbers of the layered adsorbent sheet material may be formed by stacking flat or curved sheets; or by forming a spiral roll, with the flow channels between the sheets extending from the first end of the adsorber to the second end thereof, to substantially fill the volume of the adsorber housing of the desired shape. Examples of methods and structures with packed, spirally wound adsorbents are disclosed in commonly owned, co-pending U.S. patent application Ser. No. 10/041,536, filed Jan. 7, 2002, and incorporated herein by reference.

Typical experimental sheet thicknesses have varied between about 100-300 microns, with spacer heights in the range of about 75 to 200 microns, and adsorber flow channel lengths in the range of about 10 cm to approximately 30 cm.

In other embodiments of the invention, the adsorbers may be provided as an array of spiral rolls of adsorbent sheet and spacers as described above, with the array supported in a rotor.

Alternatively, the adsorbers may be formed by winding a single spiral roll of adsorbent sheet around the rotor hub and filling the annulus to wall 21. Spacers between adjacent adsorbent sheet layers are formed by longitudinal spacers or corrugations, establishing axial flow channels between the sheets and extending between the first end 5 and second end 6, while the spacers or corrugations prevent flow transverse to the flow channels or between adjacent flow channels. Consequently, each such flow channel is isolated from neighbouring flow channels through the adsorbent mass, and serves as a small independent adsorber. With this approach, the number N of independent adsorbers may be extremely large.

Also alternatively, the adsorbers may be provided as flow channels in a monolith, for example a honeycomb cordierite extrudate with adsorbent washcoated onto the cell walls of the honeycomb. The rotor may be formed from a single extrudate section, or from an array of such sections supported on the rotor.

In all cases, the adsorbers and rotor are assembled with co-operating fluid sealing means so that substantially all fluid flow between the first and second ends of the adsorbers passes through the flow channels in the adsorbers, so that bypass leakage is avoided.

FIG. 3 shows the porting of rotor 4 in the first and second valve faces respectively in the planes defined by arrows 14'-15', and 16'-17'. An adsorber port 30 provides fluid communication directly from the first or second end of each adsorber to respectively the first or second valve face. Each such port 30 may be equivalently provided by a number of small ports for each adsorber.

Figure 5:
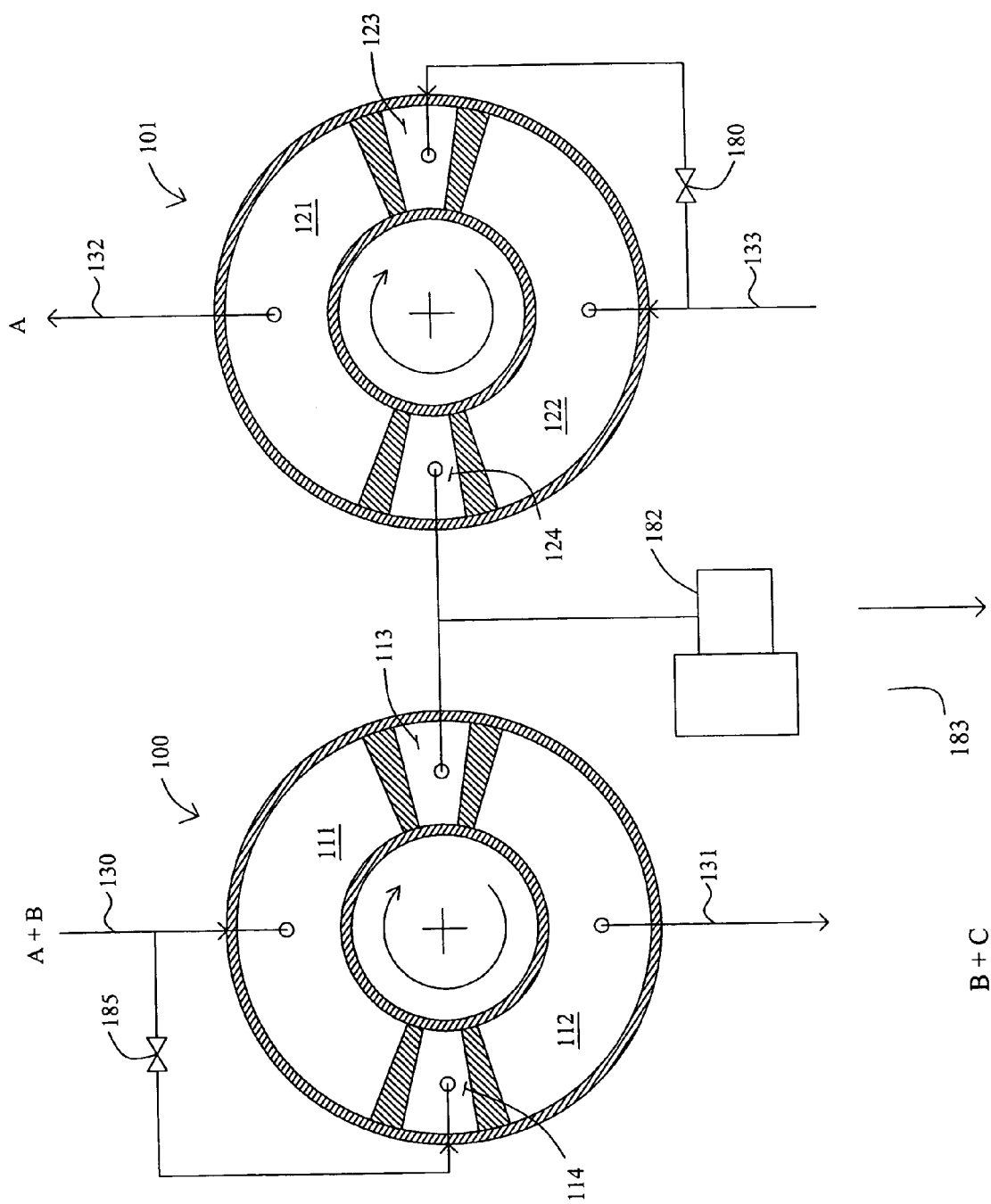
FIGS. 5 through 10 show alternative buffer step purge configurations for the module of FIG. 1.
Figure 7:
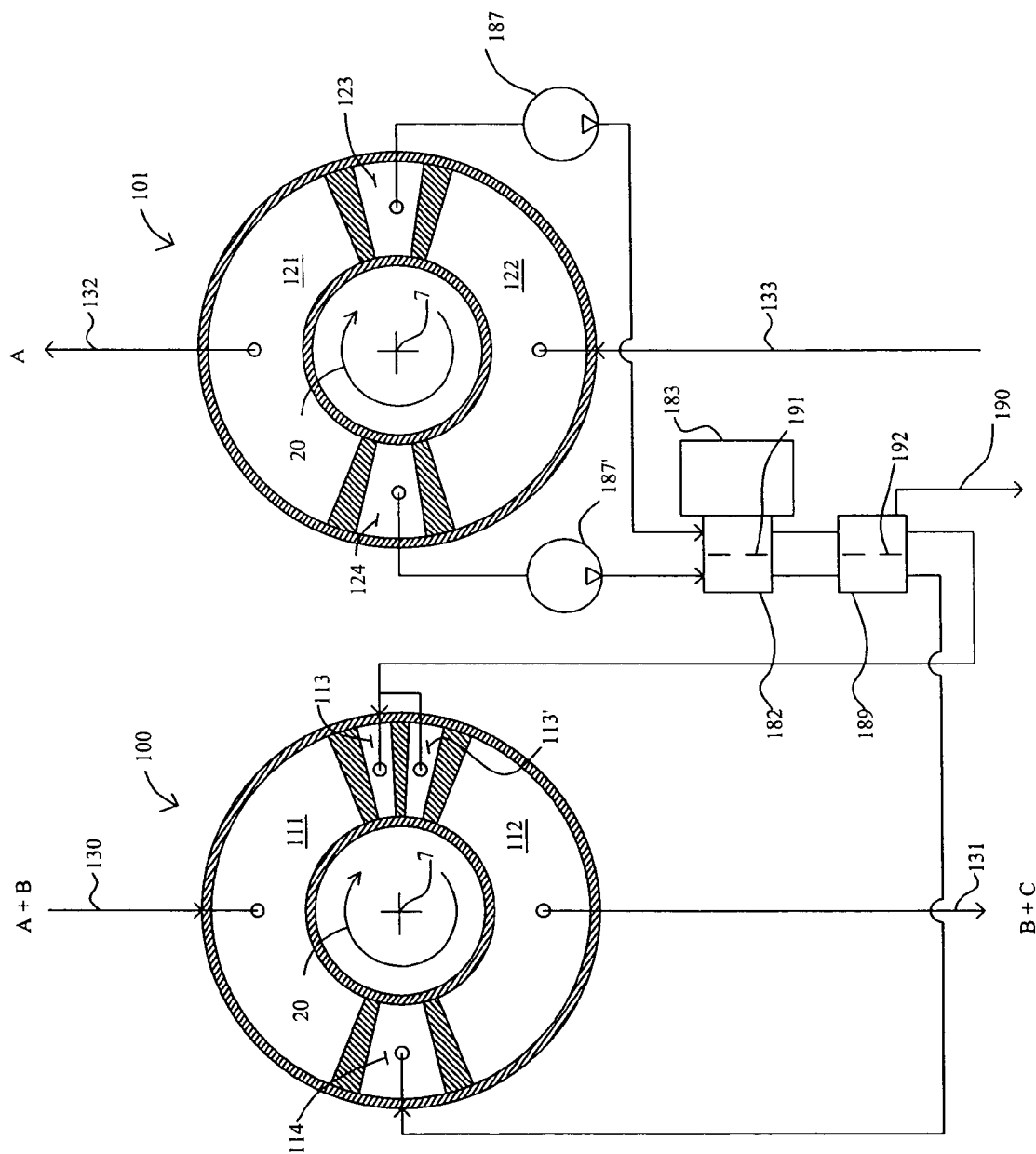
Figure 9:
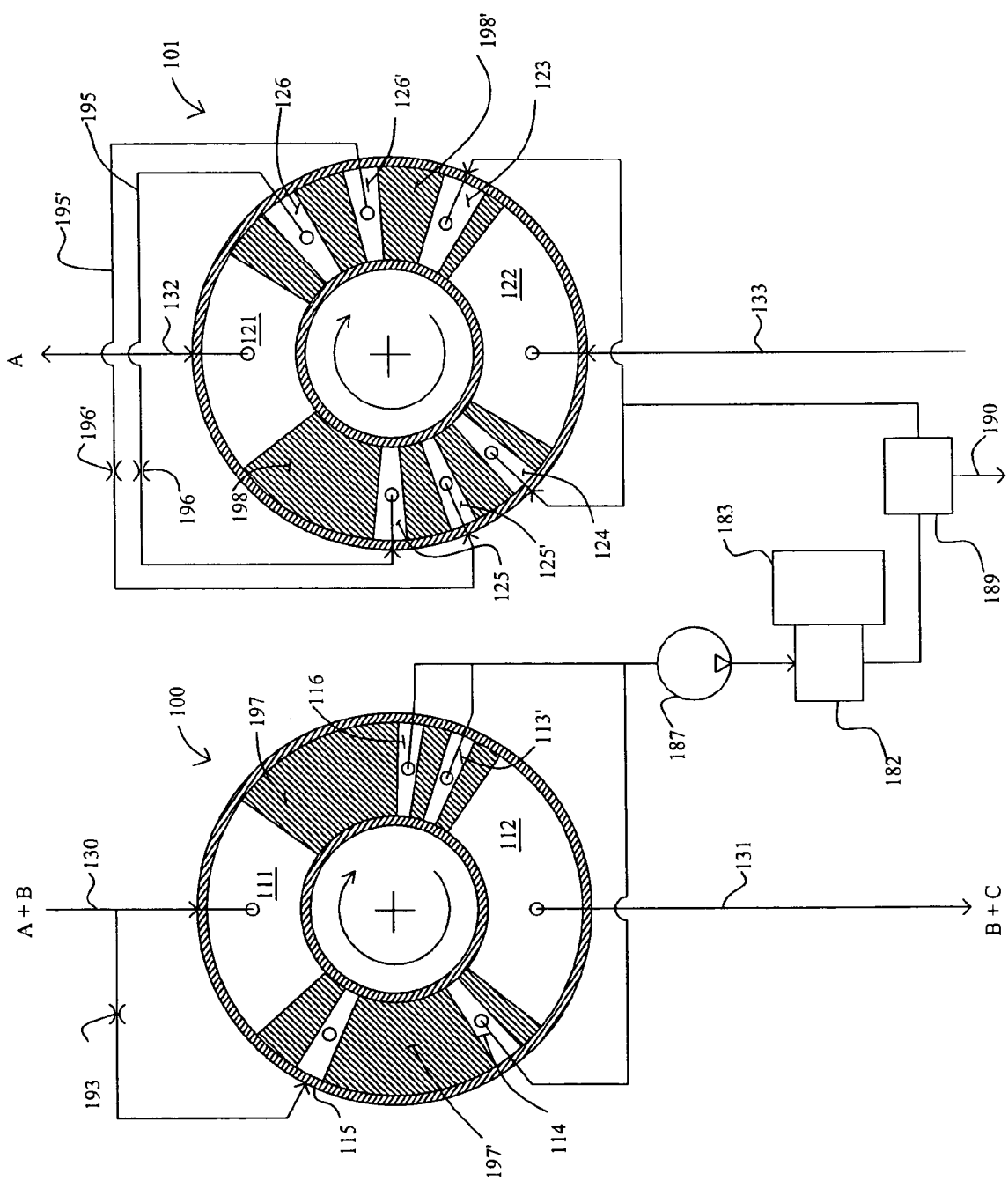

FIG. 4 shows a typical stator valve face 100 of the first stator 8 in the first valve face 10 and in the plane defined by arrows 14'-15', similar to a valve face 101 of the second stator 9 in the second valve face 11 and in the plane defined by arrows 16'-17'. Arrow 20 indicates the direction of rotation by the adsorber rotor. In the annular valve face between circumferential seals 106 and 107, the open area of first stator valve face 100 ported to external conduits is indicated by clear angular sectors 111-116, which are separated by radial seals 118 corresponding to the first functional ports communicating directly to functional compartments identified by the same reference numerals 111-116. Sector 113 is used for the first buffer step, and sector 114 is used for the second buffer step. If pressure swing is used to augment displacement purge regeneration, a sector 115 may be provided for a pressurization step and a sector 116 may be provided for a depressurization step. Similarly, the open area of second stator valve face 101 (as shown in FIGS. 5, 7 and 9) ported to external conduits is indicated by clear angular sectors 121-126, which are also separated by radial seals 118 corresponding to the first functional ports communicating directly to functional compartments identified by the same reference numerals 111-116. Typical radial seal 118 provides a transition for an adsorber between being open to adjacent sectors. A gradual opening may be provided by a tapering clearance channel between the slipper and the sealing face, so as to achieve gentle pressure equalization of an adsorber being opened to a new compartment. Much wider closed sectors may be provided to substantially stop flow to or from one end of the adsorbers when pressurization or depressurization steps are being performed from the other end.

Turning back to FIG. 1, in the first valve face 100 feed gas (the first gas mixture including components A and B) is supplied to first sector 111 as indicated by arrow 125, while heavy product (the second gas mixture including components B and C) is exhausted from second sector 112 as indicated by arrow 126. In the second valve face 101, the first or light product gas (enriched in component A) is delivered from first sector 211 as indicated by arrow 127, while displacement purge gas (including component C) is supplied to second sector 122 as indicated by arrow 128.

The rotor is supported by bearing 160 with shaft seal 161 on rotor drive shaft 162 in the first stator 8, which is integrally assembled with the first and second valve stators. The adsorber rotor is driven by motor 163 as an exemplary rotor drive means.

Figure 6:
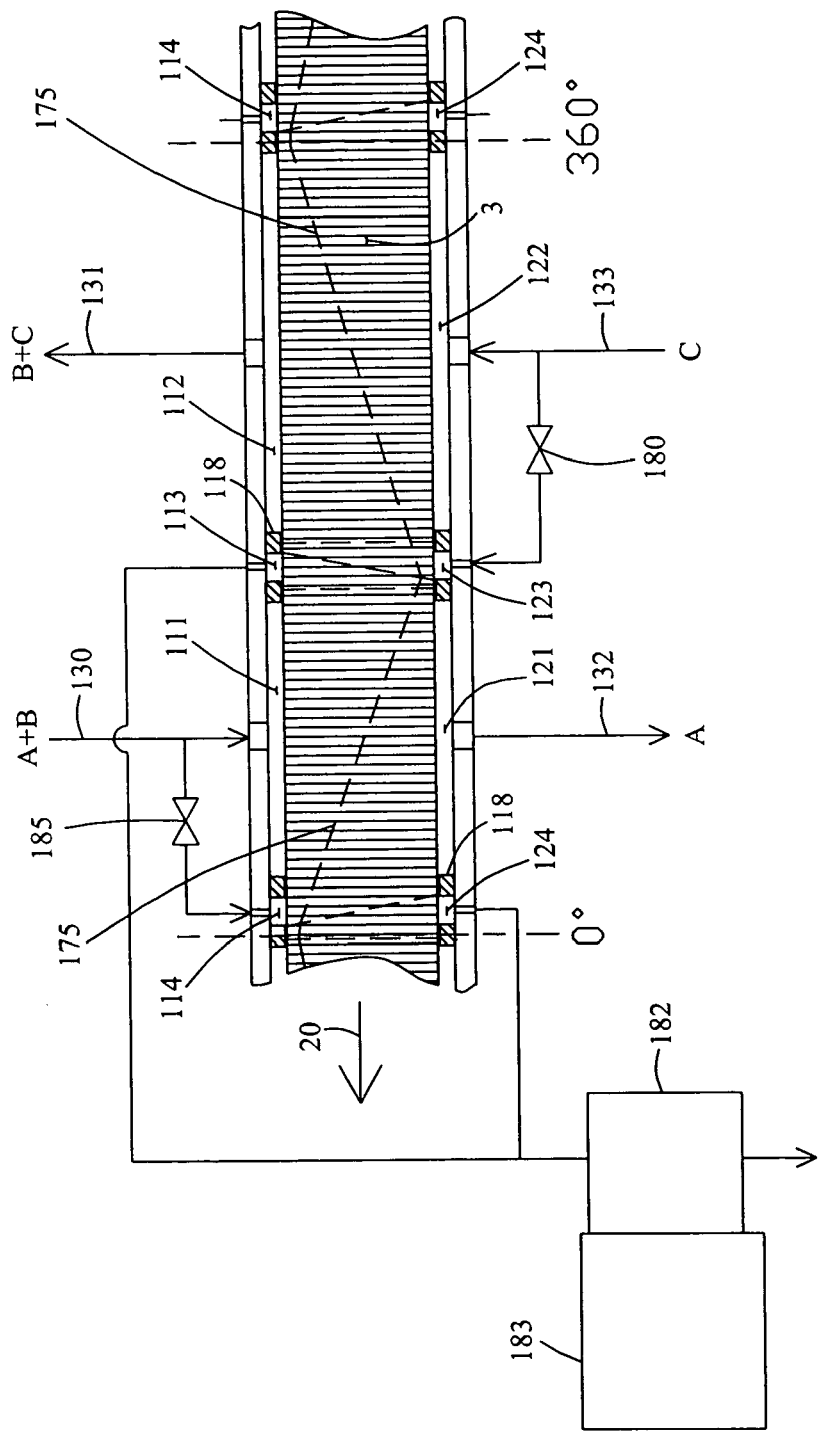

FIGS. 5 and 6

Figure 8:
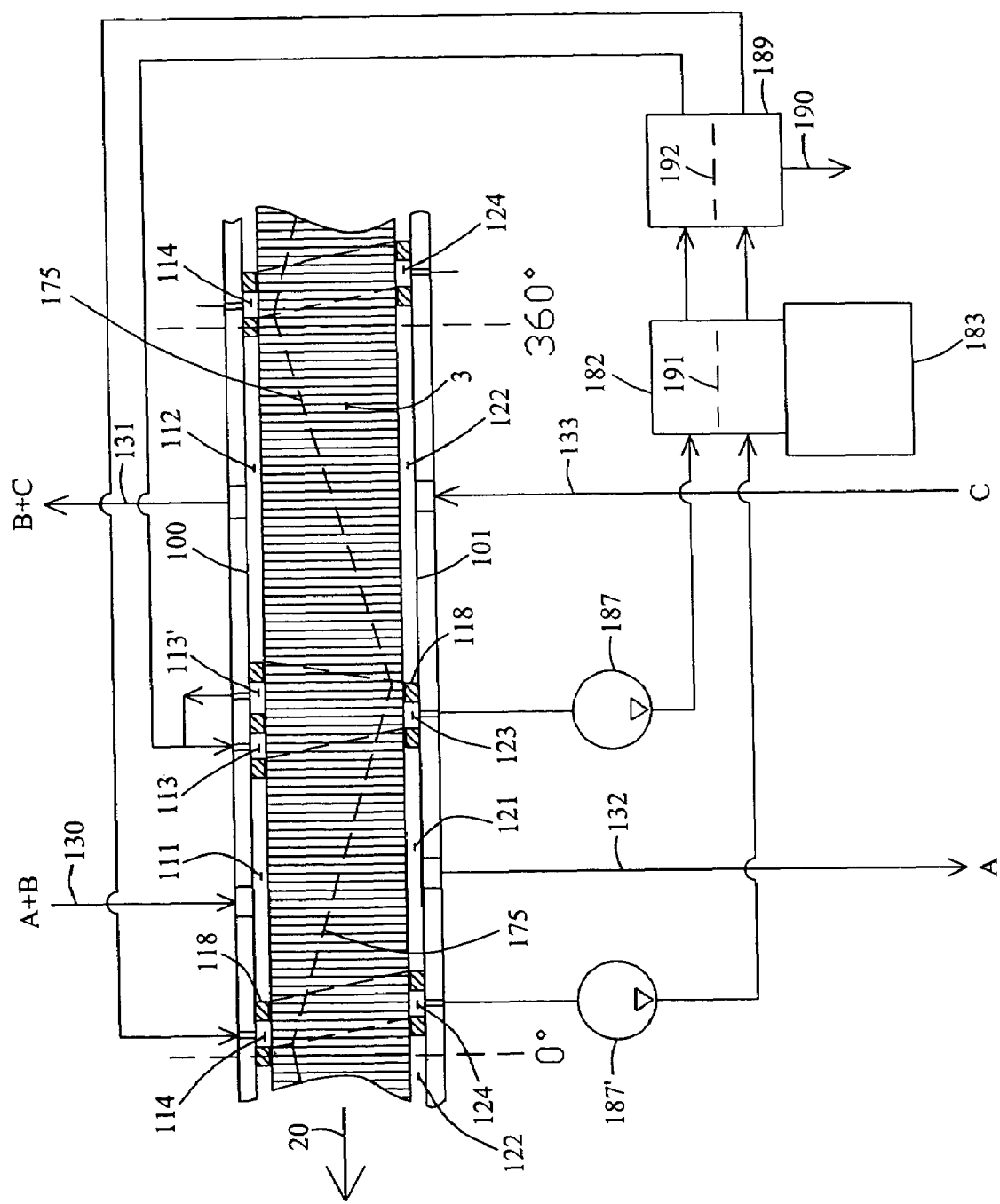
Figure 10:
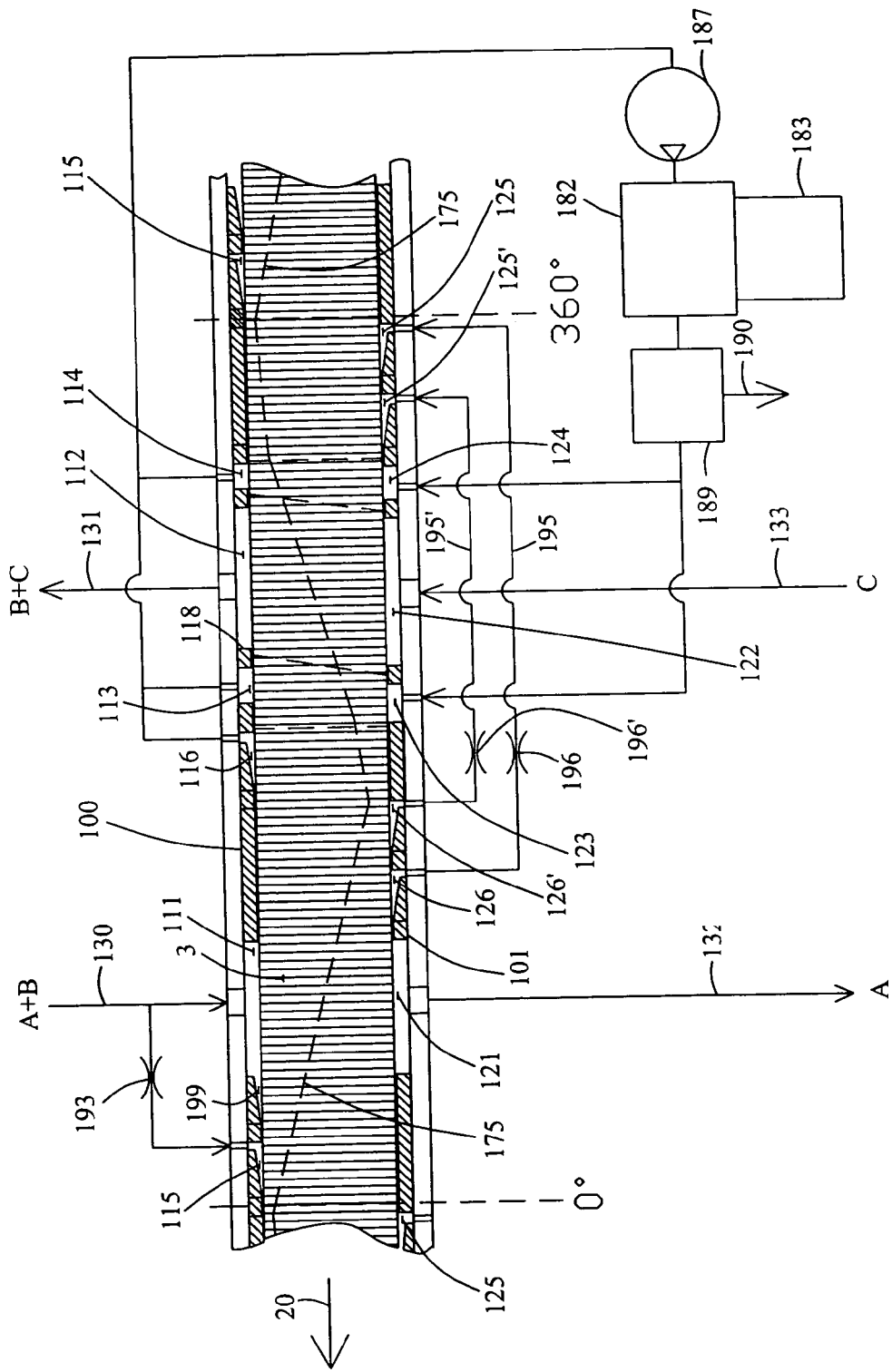

FIG. 5 shows the first and second stator valve faces 100 and 101 of an embodiment with displacement purge gas as the first buffer purge gas, and the feed or first gas mixture as the second buffer gas. In FIG. 5 and also FIGS. 7 and 9, the first and second stator valve faces are being viewed in one direction as indicated by section arrows 14'-17' so that the first stator valve face is being viewed from behind while the second valve face is being viewed from in front. FIG. 6 shows the flow pattern through the adsorbers, in a circumferential section including the angular range of 0° to 360° about axis 7. The dashed line across the adsorbers 3 in FIGS. 6, 8 and 10 represent concentration fronts between the gas mixtures A and B, B and C, and components A and C. In particular, dashed line 175 indicates movement at the carbon dioxide concentration front during the cycle.

The first buffer purge gas is admitted by valve 180 to sector 123 in the second valve face 101, and displaces gas from sector 113 in the first valve face to burner 182 with co-operating heat recovery means 183. The second buffer purge gas is admitted by valve 185 to sector 114 in the first valve face 100, and displaces gas from sector 123 in the second valve face to burner 182 with co-operating heat recovery means 183. The heat recovery means may be a heat exchanger to preheat oxidant and fuel streams being supplied to the fuel cell, or a steam generator, or an internal combustion engine, or a gas turbine, or a Stirling engine.

FIGS. 7 and 8

FIG. 7 shows the first and second stator valve faces 100 and 101 of an embodiment with recycled flue gas as the first and second buffer purge gases, with this flue gas obtained by combustion of the buffer purge gases so that unbound component C is removed from the first buffer purge gas and unbound component A is removed from the second buffer purge gas. FIG. 8 shows the flow pattern through the adsorbers, in a circumferential section including the angular range of 0° to 360° about axis 7.

The buffer gas streams are admitted to the first valve face 100, with the first buffer stream through sector 113 and the second buffer stream through sector 114. A portion of the first buffer stream is recirculated from sector 113' back to sector 113, after being displaced by the initially entering displacement purge stream.

The first buffer stream is withdrawn from sector 123 by blower or vacuum pump 187, and the second buffer stream is withdrawn from sector 124 by blower or vacuum pump 187'. The buffer streams are passed through burner 182 with co-operating heat recovery means 183, and then through condenser 189 to reject excess water through discharge conduit 190. Complete or partial separation of the first and second buffer streams may be maintained through burner 182 and condenser 189, as indicated by dashed partitions 191 and 192, so that combustion conditions on each side of partition 191 may be maintained appropriately fuel rich on the first buffer stream side in order to remove unbound component C from the first buffer purge gas, and lean on the second buffer stream side to remove unbound component A from the second buffer purge gas. Alternatively, the first and second buffer streams may be mixed through a single blower and/or vacuum pump 187, and through the burner and condenser, by maintaining closely stoichiometric combustion conditions in the burner so that unbound components A and C are both extinguished. The burner may be a catalytic combustor in order to achieve satisfactory and sufficiently complete combustion under all conditions.

FIGS. 9 and 10

FIG. 9 shows the first and second stator valve faces 100 and 101 of an embodiment with combined pressure swing and displacement purge regeneration and with recycled flue gas as the first and second buffer purge gases. FIG. 10 shows the flow pattern through the adsorbers, in a circumferential section including the angular range of 0° to 360° about axis 7.

In the first stator valve face 100, sector 115 is used for a feed pressurization step, with feed gas mixture introduced through an orifice or pressure reduction restrictor 193, while sector 116 is used for a countercurrent blowdown step for depressurization preceding the first buffer step. In the second stator valve face 101, sector 125 provides a repressurization step by light reflux (pressure equalization) through conduit 195 and restrictor 196 with sector 126 which provides the corresponding depressurization step. Sector 125' provides another repressurization step by light reflux (pressure equalization) through conduit 195' and restrictor 196' with sector 126' which provides the corresponding depressurization step.

Extended closed sectors of valve face 100 are provided as wide radial seals (e.g. 197, 197') opposite the light reflux sectors 125, 125', 126 and 126' of face 101. Similarly wide radial seals (e.g. 198, 198') are provided in closed sectors of valve face 101 opposite the feed pressurization sector 115 and the countercurrent blowdown sector 116 of face 100. It may also be noted in FIG. 10 that the radial seals leading sectors 111, 115, 116, 125, 125', 126, and 126' have tapered clearance gaps (e.g. 199) between the rotor face and the respective seal entering those sectors, so as to provide smooth pressurization and depressurization transitions by flow throttling in the tapered clearance as each adsorber comes into registration with the corresponding sector.

If desired, a purge step using light reflux of enriched component B may be included in addition to a displacement purge step including component C.

FIGS. 11-16

The following embodiments illustrate application of the invention to solid oxide fuel cell power plants. SOFC stack 302 includes a solid oxide electrolyte membrane 310 interposed between anode channel 312 and cathode channel 314. The anode channel has an inlet 316 and an outlet 318 connected by anode loop including anode exhaust conduit 319 and anode return conduit 319', while the cathode channel 314 has an inlet 320 and an outlet 321. If the fuel is natural gas, it is internally reformed within the anode channel 312, while a suitable excess concentration of recycled hydrogen and preferably some steam is maintained in anode loop 319 so as to prevent carbon deposition.

A first rotary adsorption module 1 according to the invention receives water gas shifted and cooled anode exhaust gas from anode outlet 318, first recuperator 322, water gas shift reactor 324, second recuperator 326, and water removal condenser 328 as feed gas mixture in conduit 130. The water gas shift reactor would typically have an exit temperature in the range of about 200° C. to about 400° C. Excess water is discharged by conduit 329. Hydrogen enriched gas as the light product of the first rotary adsorption module 1 is delivered by conduit 132 to recycle fan 330, after which the enriched hydrogen recycle stream is joined by feed natural gas supplied to the anode loop by infeed conduit 336. The anode recycle gas is reheated in recuperators 326 and 322 before being admitted to the anode inlet 316.

Feed air is admitted by infeed conduit 340 to air feed blower 341, and thence by recuperator 342 to cathode inlet 320. Vitiated (nitrogen-enriched) cathode exhaust air is discharged from cathode outlet to optional heat hat recovery heat exchanger 344, and back through recuperator 342 by conduit 346 which communicates to displacement purge inlet conduit 133 of the first rotary adsorption module. Spent displacement purge gas, including vitiated air and carbon dioxide, is discharged by conduit 131 to exhaust 350.

Figure 11:
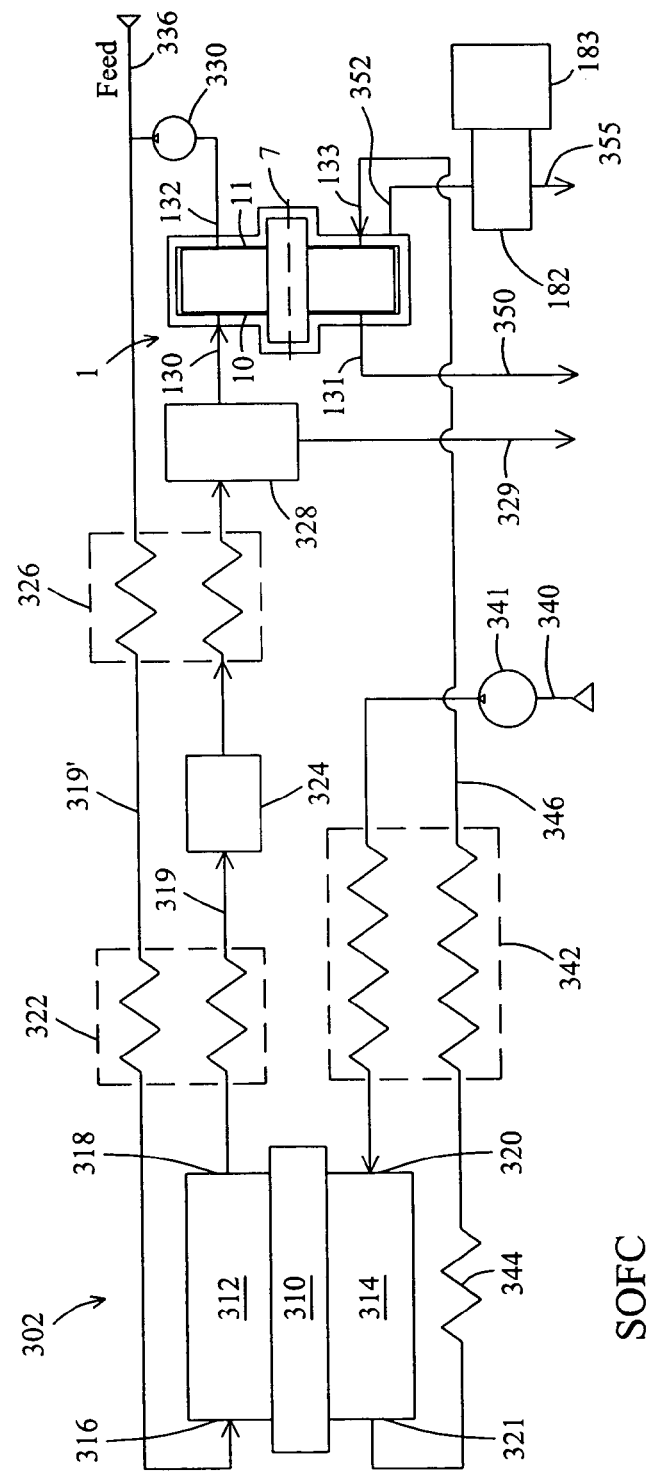
FIGS. 11 through 16 show simplified schematics of alternative SOFC power plant embodiments using the rotary adsorption module for enrichment and recycling of hydrogen from the anode exhaust gas.

In FIG. 11, the buffer purge streams are supplied from the feed gas mixture and the displacement purge gas as described for FIGS. 5 and 6 above. The buffer exhaust is schematically indicated by conduit 352 from module 1. The spent buffer purge gas is burned in burner 182 with heat recovery means 183, and discharged by flue conduit 355.

Figure 12:
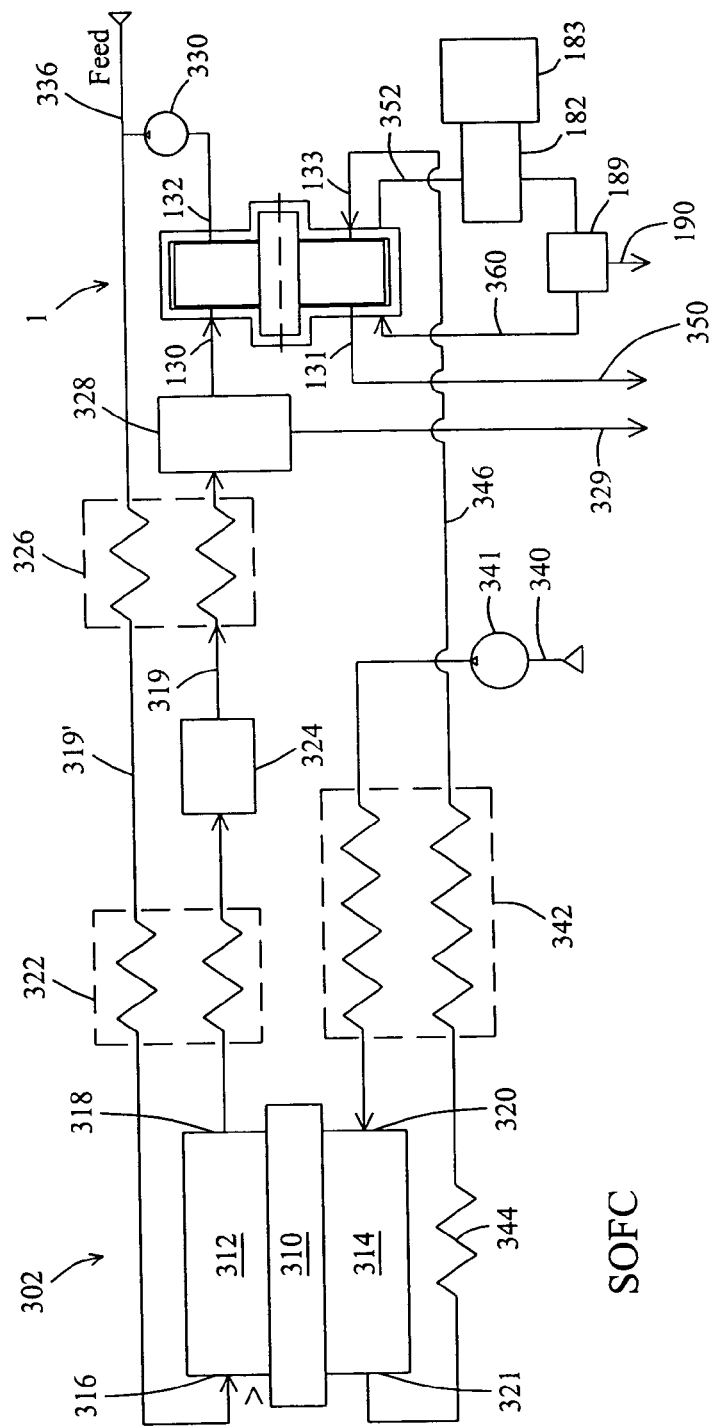

FIG. 12 illustrates a similar embodiment using recycled flue gas as the buffer purge gas, as described for FIGS. 7 and 8 above. The spent buffer purge gas is burned in burner 182 with heat recovery means 183, excess water is removed by condenser 189 and water discharge conduit 190, and the flue gas is recycle to buffer inlet sectors in module 1 by schematically depicted return conduit 360.

Figure 13:
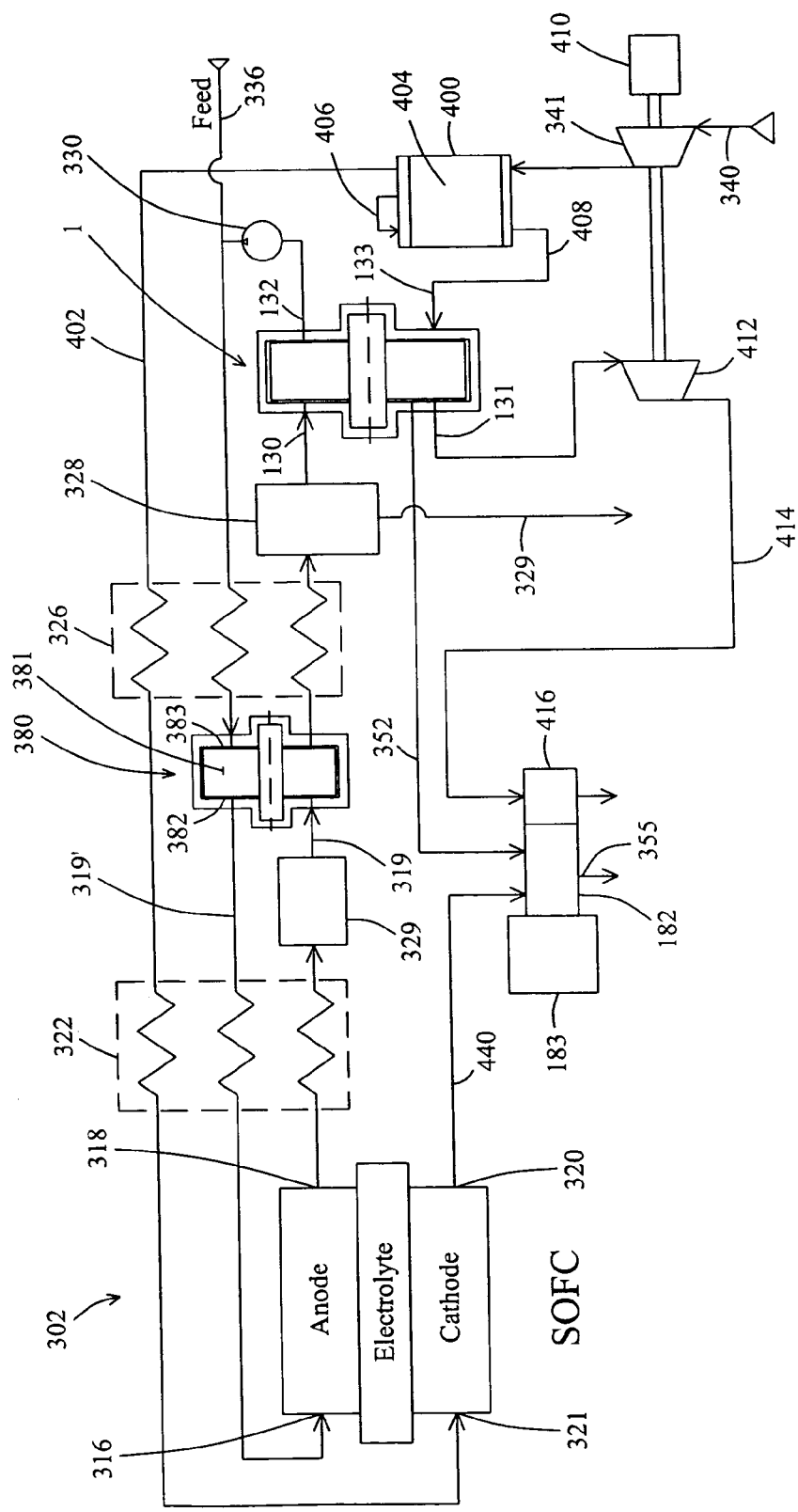

FIG. 13 shows two independent alternative features, including use of a second rotary adsorption module 380 to transfer a fraction of water vapor (remaining in the anode exhaust stream after the water gas shift step in reactor 324) from conduit 319 to anode return conduit 319', and use of a VPSA unit to provide enriched oxygen to the cathode and nitrogen-enriched exhaust to be used under vacuum as displacement purge gas. In this example, the buffer purge gas is provided from the feed gas mixture in conduit 130 and the displacement purge gas (which will be the oxygen vitiated exhaust of the oxygen VPSA) in conduit 133.

The second rotary adsorption module 380 includes an adsorber rotor 381 engaged at first and second ends with rotary valve faces 382 and 383. It uses an adsorbent with high selectivity for water vapor relative to carbon dioxide and other anode gas constituents at the operating temperature, which may be that of the water gas shift reactor exit.

In FIG. 13, enriched oxygen is delivered from oxygen VPSA unit 400 and optionally an oxygen product compressor directly to the cathode channel inlet 321 by conduit 402 through recuperators 326 and 322. The VPSA unit includes a rotary adsorber module 404 and a light reflux loop 406 to achieve high oxygen purity. The nitrogen enriched exhaust is delivered under vacuum by conduit 408 communicating to conduit 133. Motor or engine 410 drives feed blower 341 and a vacuum pump 412 which draws the nitrogen-enriched exhaust with exhaust carbon dioxide as spend displacement purge gas from conduit 131.

The vacuum pump discharge may be passed by discharge conduit 414 through a catalytic burner 416 (co-operating with heat recovery means 183) to remove any residual combustible components. Exhaust cathode gas is conveyed from the cathode channel exit 320 by conduit 440 to combustor 182, thus providing the buffer gas burner with enriched oxidant as well as heat recovery from the cathode channel.

Figure 14:
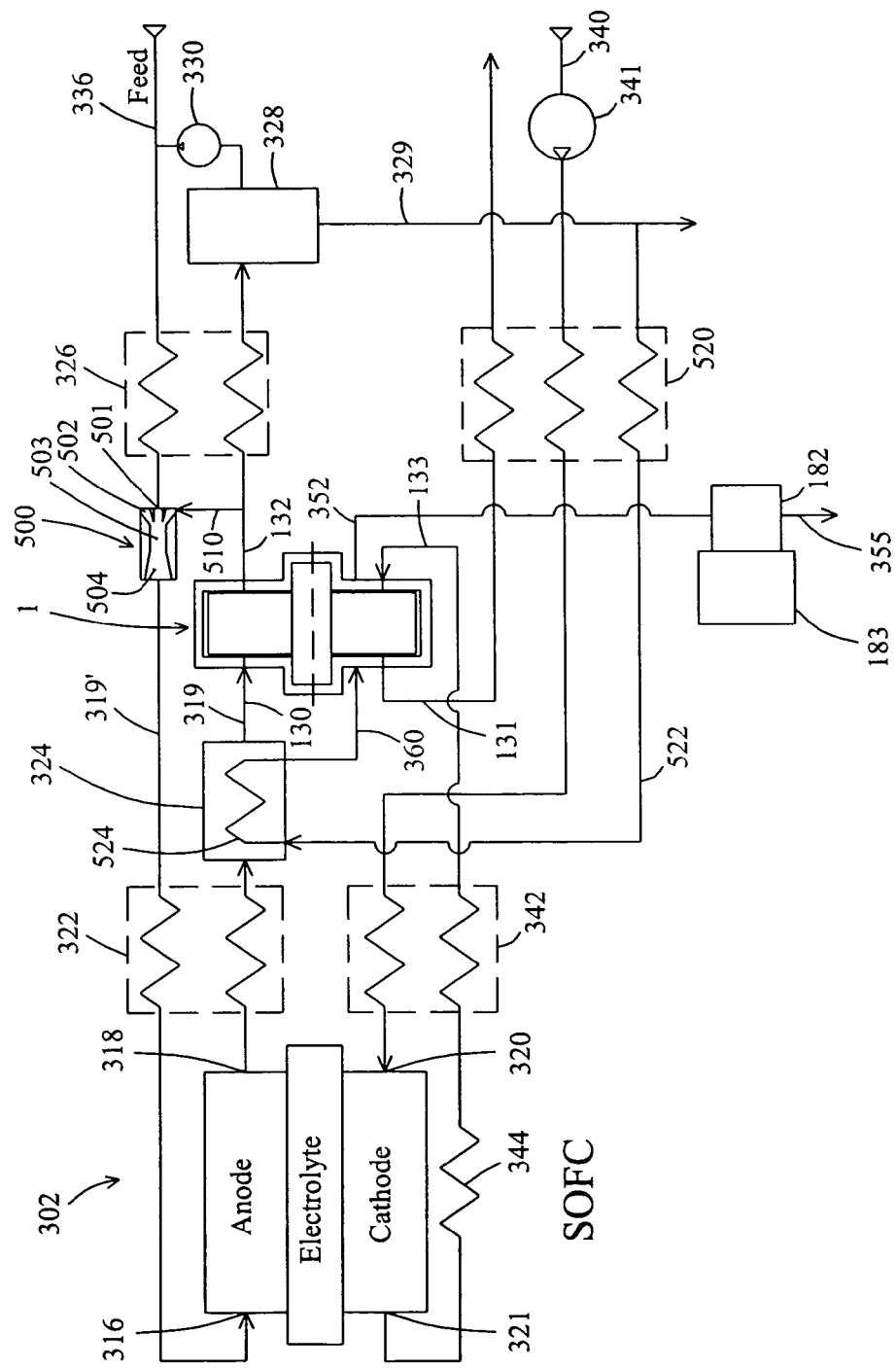
Figure 15:
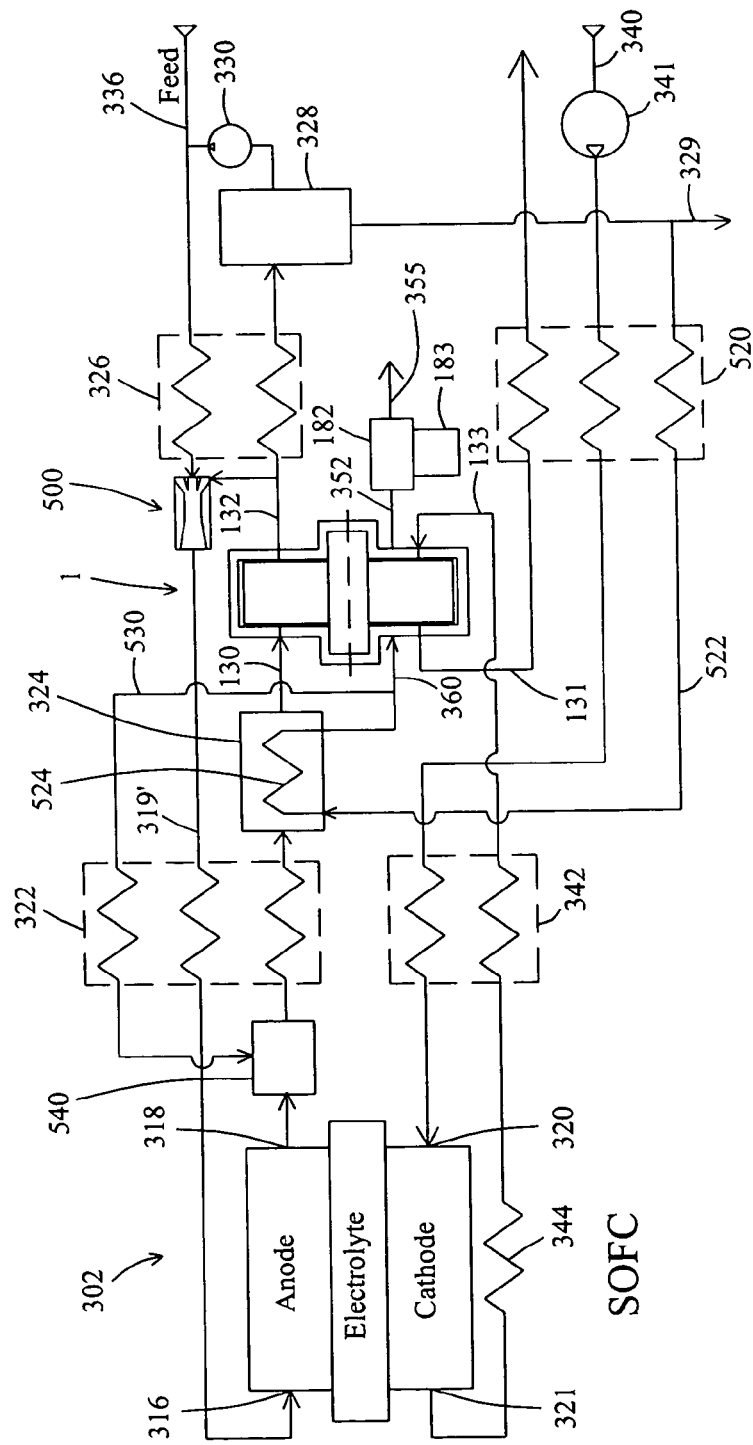
Figure 16:
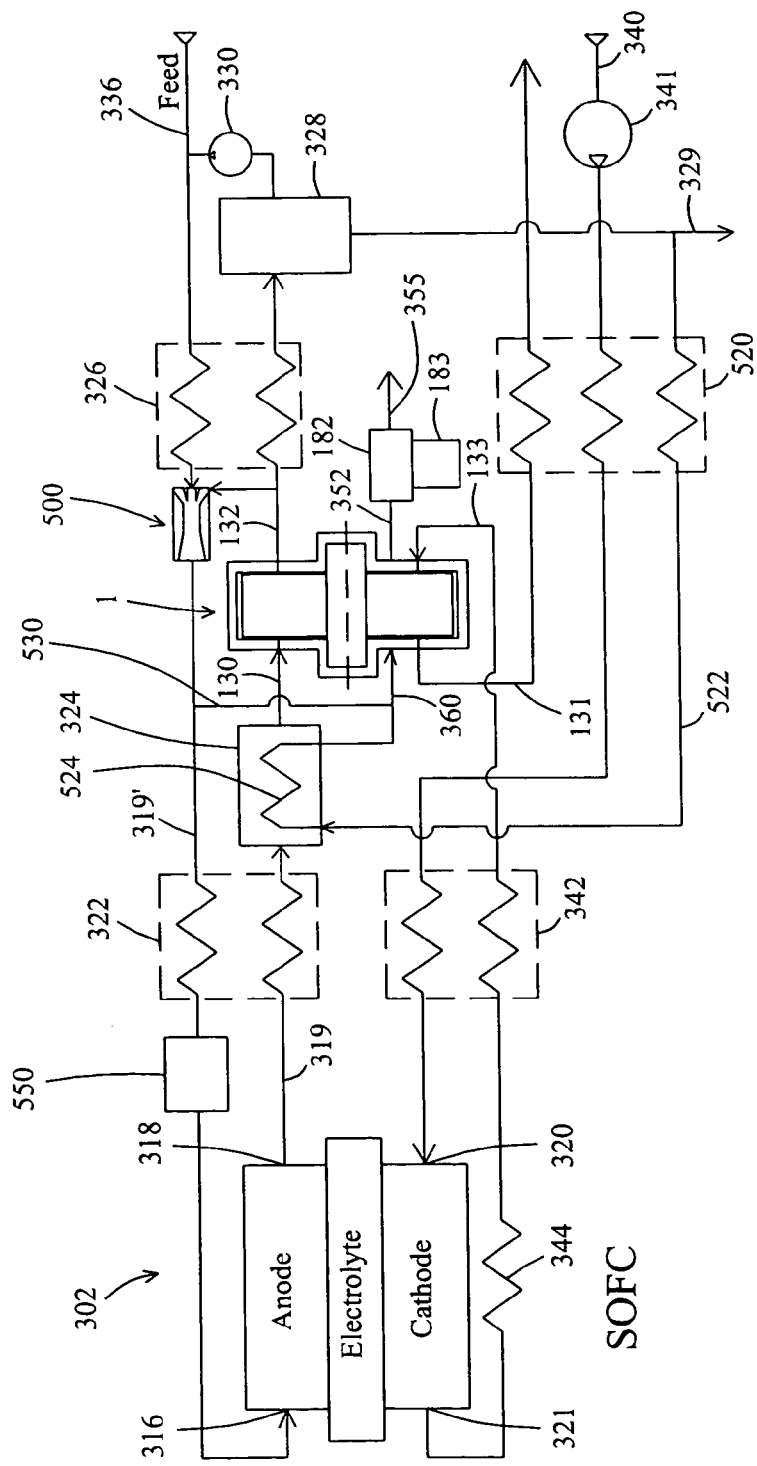

In FIGS. 11-13, the first rotary adsorption module would operate just above ambient temperature, after condensation of excess water from the feed gas mixture. FIGS. 14-16 illustrate embodiments in which the first rotary adsorption module would operate at an elevated temperature corresponding to that of the water shift reactor exit. The adsorbent would be selected for carbon dioxide selectivity and insensitivity to water vapor. An example of a suitable adsorbent is potassium promoted hydrotalcite. Carbon dioxide removal at a relatively elevated temperature will reduce the flows and heat exchange load in recuperator 326.

In FIGS. 14-16, the light product stream (enriched hydrogen) in conduit 132 is split into a first and a second recycle streams, which are recombined in ejector 500. Ejector 500 has a nozzle 501, a suction inlet 502, a mixing zone 503, and a diffuser 504. The first recycle stream is conveyed directly to suction inlet 502 by conduit 510. The second recycle stream is passed through recuperator 326, condenser 328, recycle blower 330, and with feed from infeed conduit 336 back through recuperator 326 to ejector nozzle 501. It will be seen that blower 330 provides the driving energy through nozzle 501 to operate the ejector 500.

In FIG. 14, a fraction of the water condensate in conduit 329 is conveyed through recuperator 520 by conduit 522, and thence to steam generator coil 524 in the water gas shift reactor 324, and as steam to be used as the buffer purge via conduit 360. The spent buffer purge steam is carried by conduit 352 to burner 182.

In FIGS. 15 and 16, a portion of the steam from steam generator coil 524 is recycled by conduit 530 to the anode gas loop. In FIG. 15, conduit 530 conveys steam through recuperator 322 to a post-reformer reactor 540 which adiabatically converts a portion of unreacted methane and unreacted carbon monoxide in the anode exhaust gas from outlet 318. The post-reformer uses any of the known catalysts effective for steam methane reforming or high temperature water gas shift. Alternatively, conduit 530 may simply introduce the steam to the inlet of water gas shift reactor 524, without having passed through recuperator 322. This steam addition, and the consequent greater extent of water gas shift achieved, is highly desirable to maximize hydrogen recovery, to assist in water removal from the anode loop, and also to elevate the carbon dioxide concentration in conduit 130 for more effective removal. A further important advantage is the maximal removal of carbon monoxide from the anode return conduit 319', as highly desirable to reduce the risk of carbon deposition in the anode channel and to facilitate carbon-free operation with a minimal concentration of steam in the anode inlet.

FIG. 16 shows the steam from conduit 530 being supplied to a pre-reformer 550 for partially converting the feed fuel to syngas (hydrogen and carbon monoxide) as well as methanating part of that syngas, so that higher hydrocarbons are at least partially converted to methane in order to reduce the risk of soot deposition in the fuel cell anode channel. The pre-reformer also re-establishes the water gas shift equilibrium to minimize carbon monoxide after carbon dioxide removal in the first rotary adsorption module, so as to widen the margin of safety against carbon deposition. The pre-reformer will use a steam reforming catalyst that may be selected for tolerance to feed impurities, and may operate at a relatively low temperature in the range of about 400° C. to about 600° C. so as to promote the methanation reaction. The pre-reformer may operate adiabatically, with at least partial heat balance between the endothermic steam reforming reaction and the exothermic methanation reaction. In the present invention, methane is a desirable component of the anode feed since it will act as a scavenger (by steam reforming) for water generated by the fuel cell reaction. Recycle hydrogen from the first rotary adsorption module may be passed through the pre-reformer with the feed fuel as shown in FIG. 16, or alternatively may be bypassed directly to the anode inlet 316 without passing through the pre-reformer.

Steam must be added to the inlet of pre-reformer 550 at a sufficient concentration for steam reforming and coking suppression in the pre-reformer.

Water vapor may be transferred across the anode loop in any of the embodiments by a second rotary adsorption module 380 (as shown in FIG. 13) operating as a desiccant humidity exchanger coupled between conduits 319 and 319'.

A heat engine may be used as the thermal bottoming system to recover waste heat available from heat recovery means 183 associated with buffer gas combustion, or waste heat from the fuel cell stack heat exchanger 344, or waste heat from the exothermic water gas shift reactor. While some waste heat will be used to preheat reactants and to overcome heat exchanger losses, there may be useful scope for a supplemental heat engine, to drive plant auxiliaries such as fans, blowers and vacuum pumps, and possibly to deliver supplemental power for export.

As hydrogen enrichment and optional oxygen enrichment features of the present invention serve to elevate the fuel cell voltage efficiency and stack power output, it may be preferred that all export power be exported by the fuel cell stack, and that the heat engine(s) therefore be used solely to drive plant auxiliaries.

Engine 410 may be a gas turbine using air as its working fluid (as in some embodiments of copending patent application "Energy Efficient Gas Separation for Fuel Cells" filed Oct. 26, 2001, whose entire disclosure is incorporated herein), heated by indirect heat exchange with the anode and/or cathode gases and by combustion of the heavy product exhaust gas from the first PSA unit and/or by combustion of supplemental natural gas fuel.

Alternatively, the anode gas mixture may be used directly as the working fluid for a fuel cell stack heat recovery thermodynamic cycle, e.g. by a recuperative gas turbine. This is particularly attractive when an oxygen VPSA unit is used to concentrate enriched oxygen as the cathode oxidant stream. The gas turbine may then serve as engine 410 to operate the oxygen separation unit, and would preferably be applied in turbocharger configurations.

Engine 410 may be an internal combustion engine fuelled by spent buffer gas containing hydrogen and other fuel values, and/or by supplemental natural gas fuel. Alternatively, engine 410 may be any type of external combustion engine, e.g. a steam engine or a Stirling engine. Since the first rotary adsorption module generates enriched hydrogen, the heat recovery means may advantageously be a Stirling engine with hydrogen working fluid.

It will be evident that there may be many other alternatives and variations of the disclosed systems and processes that do not stray from the scope of this disclosure.

For SOFC power plants, the disclosed systems and processes may enhance power generation performance by increasing the ratio of hydrogen to steam partial pressure in the anode. Estimated efficiencies based on fuel lower heating value are in the range of about 65% to about 75% for natural gas fuelled fuel cell power plants. The disclosed systems and processes also facilitate cogeneration of efficiently generated electrical power, purified hydrogen, and low-grade waste heat suitable for building heating or domestic hot water utilities.

Having illustrated and described the principles of the disclosure with reference to several embodiments, it should be apparent to those of ordinary skill in the art that the invention may be modified in arrangement and detail without departing from such principles.

What is claimed is:

1. An electrical current generation system comprising:
a fuel cell configured to operate at a temperature of at least about 250° C. and having an anode inlet and an anode exhaust outlet; and
a rotary adsorption module fluidly connected to the anode exhaust outlet and the anode inlet, and operable to receive exhaust gas from the anode exhaust outlet, to separate and enrich usable fuel gas from the exhaust gas by adsorptive means, and to deliver such enriched usable fuel gas to the anode inlet, wherein the rotary adsorption module comprises:
a rotor and a stator mutually defining a rotary distributor valve, wherein the rotor comprises:
plural adsorbers having first and second ends, each adsorber comprising an adsorbent material and defining a flow path in contact with the adsorbent material between the first and second ends;
a first rotor valve surface fluidly coupled to the first ends of the adsorbers; and a second rotor valve surface fluidly coupled to the second ends of the adsorbers;
and wherein the stator comprises:
a first stator valve surface in relatively rotatable communication with the first rotor valve a second stator valve surface in relatively rotatable communication with the second rotor valve surface;
a feed gas function compartment opening into at least one of the first stator valve surface or the second stator valve surface and configured to provide the exhaust gas from the anode exhaust outlet to adsorbers through the first stator valve surface or the second stator valve surface and the first rotor valve surface or the second rotor valve surface;
a displacement purge gas function compartment opening into at least one of the first stator valve surface or the second stator valve surface and configured to provide a displacement purge gas to the adsorbers through the first stator valve surface or the second stator valve surface and the first rotor valve surface or the second rotor valve surface; and
a buffer gas function compartment configured to provide a buffer gas to the adsorbers through the first stator valve surface or the second stator valve surface and the first rotor valve surface or the second rotor valve surface.

2. The system of claim 1, wherein the fuel cell comprises a cathode inlet and a cathode exhaust gas outlet, and the displacement purge gas function compartment is fluidly coupled to the cathode exhaust gas outlet to provide cathode exhaust gas as the displacement purge gas.

3. The system of claim 1, wherein the fuel cell comprises a cathode inlet, the rotary adsorption module is a first rotary adsorption module, and the system further comprises a second rotary adsorption module fluidly coupled to the cathode inlet to introduce oxygen-enriched air into the cathode inlet.

4. The system of claim 1, wherein the adsorbent material comprises layers and at least one spacer between the layers.

5. The system of claim 1, wherein the adsorbent material comprises an adsorbent laminate structure having a void fraction of about 10% to 50% of the laminate structure volume.

6. The system of claim 1, wherein the adsorbent material comprises an adsorbent laminate structure having a void fraction of about 20% to 30% of the laminate structure volume.

7. The system of claim 1, wherein the fuel cell comprises a solid oxide fuel cell.

8. The system of claim 1, wherein the fuel gas and the displacement purge gas are incompatible.

9. The system of claim 1, wherein the displacement purge gas function compartment is fluidly coupled to an air or nitrogen-enriched air source for providing air or nitrogen-enriched air as the displacement purge gas to the adsorbers.

10. The system of claim 3, wherein the second rotary adsorption module is also fluidly coupled to the displacement purge gas function compartment to provide nitrogen-enriched air as the displacement purge gas to the adsorbers.

11. The system of claim 9, wherein the fuel cell comprises a solid oxide fuel cell.

12. The system of claim 5, wherein at least one adsorber includes at least one spacer between layers of adsorbent material.

13. The system of claim 11, wherein the anode inlet is fluidly coupled to a hydrogen fuel source.

14. The system of claim 2, wherein the anode inlet is fluidly coupled to a hydrogen fuel source, and the cathode inlet is fluidly coupled to an air or nitrogen-enriched air source.

* * * * *